(12) United States Patent
Vanbrocklin et al.

(10) Patent No.: US 12,488,017 B2
(45) Date of Patent: Dec. 2, 2025

(54) MULTI-TENANT DATABASE REPLICATION AND SHARDING

(71) Applicant: Rockwell Automation Technologies, Inc., Mayfield Heights, OH (US)

(72) Inventors: Daniel A. Vanbrocklin, Troy, MI (US); Matthew G. White, Rochester Hills, MI (US); Joshua Searles, Flushing, MI (US); Andrew M. Wilber, Franklin, WI (US); Jason W. Malzahn, Rochester Hills, MI (US); Alex G. Castle, Seattle, WA (US); Michael J. Pantaleano, Milwaukee, WI (US); Jerry L. Foster, Goodrich, MI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 18/322,677

(22) Filed: May 24, 2023

(65) Prior Publication Data

US 2024/0394275 A1 Nov. 28, 2024

(51) Int. Cl.
 *G06F 16/27* (2019.01)
(52) U.S. Cl.
 CPC .................... *G06F 16/27* (2019.01)
(58) Field of Classification Search
 CPC .................................................. G06F 16/27
 USPC ........................................................ 707/634
 See application file for complete search history.

(56) References Cited

U.S. PATENT DOCUMENTS

| 10,291,607 | B1 | 5/2019 | Cifelli |
| 2003/0055933 | A1 | 3/2003 | Ishizaki et al. |
| 2006/0074498 | A1 | 4/2006 | Kalan et al. |
| 2008/0189287 | A1* | 8/2008 | Traub .............. G06F 21/6218 707/999.009 |
| 2009/0089682 | A1 | 4/2009 | Baier et al. |
| 2009/0288084 | A1 | 11/2009 | Astete et al. |
| 2012/0144313 | A1 | 6/2012 | Park et al. |
| 2013/0191106 | A1 | 7/2013 | Kephart et al. |
| 2013/0211870 | A1 | 8/2013 | Lawson et al. |
| 2014/0047107 | A1 | 2/2014 | Maturana et al. |

(Continued)

FOREIGN PATENT DOCUMENTS

| EP | 2 801 935 A1 | 11/2014 |
| EP | 3979166 A1 | 4/2022 |
| WO | 2019/092544 A1 | 5/2019 |

OTHER PUBLICATIONS

Non-Final Office Action received for U.S. Appl. No. 18/320,268, dated Apr. 9, 2024, 23 pages.

(Continued)

*Primary Examiner* — Mark E Hershley
*Assistant Examiner* — Antonio J Caiado
(74) *Attorney, Agent, or Firm* — Amin, Turocy & Watson, LLP

(57) ABSTRACT

A multi-tenant, cloud-based Software-as-a-Service (SaaS) manufacturing platform offers a variety of industrial applications to end customers—including but not limited to MES, ERP, quality management, supply chain management, and customer relationship management (CRM)—and implements associated architectural features that address a number of issues relating to data sharing, security, scalability, and other concerns.

20 Claims, 21 Drawing Sheets

(56) References Cited

U.S. PATENT DOCUMENTS

| | | |
|---|---|---|
| 2014/0289391 A1 | 9/2014 | Balaji et al. |
| 2014/0317701 A1 | 10/2014 | Eicken et al. |
| 2014/0336791 A1 | 11/2014 | Asenjo et al. |
| 2014/0336795 A1 | 11/2014 | Asenjo et al. |
| 2016/0306866 A1* | 10/2016 | Kuruganti ............. G06F 16/273 |
| 2017/0277171 A1* | 9/2017 | Asenjo ............... G05B 19/4185 |
| 2018/0225317 A1 | 8/2018 | Lalani et al. |
| 2018/0373811 A1* | 12/2018 | Fink .................. H04W 56/0015 |
| 2019/0132301 A1 | 5/2019 | Banga et al. |
| 2019/0312857 A1 | 10/2019 | Lander et al. |
| 2020/0067789 A1* | 2/2020 | Khuti .................. H04L 41/5009 |
| 2020/0133224 A1 | 4/2020 | Popp |
| 2020/0201827 A1* | 6/2020 | Chacko ................. G06F 9/4451 |
| 2020/0265062 A1 | 8/2020 | Srinivasan et al. |
| 2020/0272981 A1 | 8/2020 | Kirkegaard |
| 2021/0089009 A1 | 3/2021 | Höfele et al. |
| 2021/0089959 A1 | 3/2021 | Ghosh et al. |
| 2021/0096551 A1 | 4/2021 | Sayyarrodsari et al. |
| 2021/0097554 A1 | 4/2021 | Manicka |
| 2021/0132582 A1 | 5/2021 | Biernat |
| 2021/0144517 A1 | 5/2021 | Guim Bernat et al. |
| 2021/0208571 A1* | 7/2021 | Thomsen ................ G06F 16/25 |
| 2022/0027529 A1 | 1/2022 | Zarur et al. |
| 2022/0222623 A1 | 7/2022 | Stump |
| 2022/0239465 A1 | 7/2022 | Woerner |
| 2022/0245177 A1* | 8/2022 | Mack ................... G06F 16/2365 |
| 2022/0255854 A1 | 8/2022 | Baker et al. |
| 2022/0327119 A1* | 10/2022 | Gasper ................ G06F 16/9024 |
| 2022/0337699 A1 | 10/2022 | Byrne |
| 2022/0353339 A1 | 11/2022 | Singh |
| 2023/0017237 A1 | 1/2023 | Dunn et al. |
| 2023/0048011 A1 | 2/2023 | Mody et al. |
| 2023/0114142 A1 | 4/2023 | Panikkar et al. |
| 2023/0126456 A1 | 4/2023 | Donelan et al. |
| 2023/0156826 A1* | 5/2023 | Palermo .............. H04W 40/248 |
| | | 370/329 |
| 2023/0224304 A1 | 7/2023 | Lukanov |
| 2023/0281618 A1 | 9/2023 | Cella |
| 2023/0376859 A1* | 11/2023 | Miller ................... H04L 63/101 |
| 2024/0086416 A1 | 3/2024 | Singh et al. |
| 2024/0364509 A1 | 10/2024 | Potlapally et al. |

OTHER PUBLICATIONS

Final Office Action received for U.S. Appl. No. 18/320,268, dated Sep. 26, 2024, 40 pages.
Wikipedia, "Software as a Service", Wikipedia, The Free Encyclopedia, Online available at URL: https://en.wikipedia.org/w/index.php?t%20itle=Software%20as%20a%20service&oldid=499825452, Retrieved from the internet Dec. 13, 2024, 7 pages.
Extended European Search Report received for European Patent Application Serial No. 24176038.8 dated Oct. 14, 2024, 9 pages.
Extended European Search Report received for European Patent Application Serial No. 24176036.2 dated Oct. 14, 2024, 7 pages.
Extended European Search Report received for European Patent Application Serial No. 24176037.0 dated Oct. 9, 2024, 10 pages.
Shojaeinasab et al., "Intelligent Manufacturing Execution Systems: A Systematic Review", Journal of Manufacturing Systems, vol. 62, 2022, pp. 503-522.
Non-Final Office Action received for U.S. Appl. No. 18/322,268 dated Mar. 20, 2025, 18 pages.
Final Office Action received for U.S. Appl. No. 18/320,287 dated May 27, 2025, 23 pages.
Saberi et al., "Blockchain Technology and its Relationships to Sustainable Supply Chain Management", International Journal of Production Research, 2018, 20 pages.
Barenji et al., "Blockchain-based Ubiquitous Manufacturing: A Secure and Reliable Cyber-physical System", International Journal of Production Research, Oct. 29, 2019, 24 pages.
Final Office Action received for U.S. Appl. No. 18/320,268 dated May 23, 2025, 14 pages.
Non-Final Office Action received for U.S. Appl. No. 18/322,162 dated Jun. 4, 2025, 20 pages.
Perducat et al., "Evolution and Trends of Cloud on Industrial OT Networks", in IEEE Open Journal of Industry Applications, vol. 4, 2023, pp. 291-303.
Non-Final Office Action received for U.S. Appl. No. 18/320,261 dated Jun. 18, 2025.
Non-Final Office Action received for U.S. Appl. No. 18/320,268, dated Dec. 13, 2024.
Non-Final Office Action received for U.S. Appl. No. 18/320,287, dated Feb. 12, 2025.
Abeyratne, et al. Blockchain Ready Manufacturing Supply Chain Using Distributed Ledger. Wolfson School of Mechanical, Electrical, and Manufacturing Engineering, Loughborough University, UK. International Journal of Engineering and Technology—IJRET vol. 05 Issue—Sep. 9, 2016.
Leng, et al. Blockchain Secured Smart Manufacturing in Industry 4.0: A Survey. Guandong University of Technology. IEEE Transactions on Systems Man and Cybermetrics Systems. Jan. 2021.
Peters, et al. Understanding Modern Banking Ledgers Through Blockchain Technologies: Future of Transaction Processing and Smart Contracts on the Internet of Money. Department of Statistical Science, University College London, Nov. 19, 2015.
Final Office Action received for U.S. Appl. No. 18/322,162 dated Oct. 1, 2025, 16 pages.
Non-Final Office Action received for U.S. Appl. No. 18/322,235 dated Sep. 15, 2025, 29 pages.
Final Office Action received for U.S. Appl. No. 18/322,268 dated Sep. 26, 2025, 19 pages.
Non-Final Office Action received for U.S. Appl. No. 18/320,282 dated Aug. 26, 2025, 29 pages.
Non-Final Office Action received for U.S. Appl. No. 18/322,655 dated Sep. 11, 2025, 32 pages.
Non-Final Office Action received for U.S. Appl. No. 18/320,287 dated Sep. 22, 2025, 25 pages.
Christidis et al., "Blockchains and Smart Contracts for the Internet of Things", Department of Electrical and Computer Engineering, IEEE Access, vol. 4, May 10, 2016, pp. 2292-2303.

\* cited by examiner

MULTI-TENANT DATABASE REPLICATION AND SHARDING

TECHNICAL FIELD

The subject matter disclosed herein relates generally to industrial automation systems, and, for example, to cloud-based industrial data collection, analysis, and sharing.

BACKGROUND ART

As cloud-based computing platforms become more widely available, industrial enterprises are exploring ways in which their operations can benefit by moving portions of their operations to the cloud. Moreover, the global scope afforded by cloud computing opens the possibility of multi-tenant industrial software that can serve multiple enterprises and users, and can assist in coordinating operations of facilities or supply chain entities in different locations. However, there are still many challenges that render wider implementation of cloud-based industrial solutions difficult, including data accessibility across data centers, security issues, data sharing concerns and limitations, and other issues. Some of these issues are due in part to certain architectural limits of current cloud platform architectures.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising internal services that implement a manufacturing cloud system, wherein the manufacturing cloud system is a multi-tenant Software-as-a-Service (SaaS) system that executes an industrial manufacturing execution system (MES) on a cloud platform, and the manufacturing cloud system collects and stores industrial data owned by multiple customer entities in multiple data silos; a tagging component configured to tag items of the industrial data associated with a first entity of the multiple customer entities with metadata to yield tagged data, wherein the metadata for a data item, of the items of the industrial data, identifies a data type of the data item and indicates whether the data item is sharable with one or more second entities of the customer entities; and a data sharing component configured to distribute, based on the metadata, a portion of the tagged data from a first data silo, of the multiple data silos, to one or more second data silos of the multiple data silos accessible by the one or more second entities.

Also, one or more embodiments provide a method, comprising executing, by a system comprising a processor, a manufacturing cloud system, wherein the manufacturing cloud system is a multi-tenant Software-as-a-Service (SaaS) system that executes an industrial manufacturing execution system (MES) on a cloud platform, and the manufacturing cloud system collects and stores industrial data owned by multiple customer entities in multiple data silos; tagging, by the system, items of the industrial data associated with a first entity of the multiple customer entities with metadata to yield tagged data, wherein the metadata for a data item, of the items of the industrial data, identifies a data type of the data item and indicates whether the data item is sharable with one or more second entities of the customer entities; and distributing, by the system based on the metadata, a portion of the tagged data from a first data silo, of the multiple data silos, to one or more second data silos of the multiple data silos accessible by the one or more second entities.

Also, according to one or more embodiments, a non-transitory computer-readable medium is provided having stored thereon instructions that, in response to execution, cause a system comprising a processor to perform operations, the operations comprising implementing a manufacturing cloud system, wherein the manufacturing cloud system is a multi-tenant Software-as-a-Service (SaaS) system that executes an industrial manufacturing execution system (MES) on a cloud platform, and the manufacturing cloud system collects and stores industrial data owned by multiple customer entities in multiple data silos; tagging items of the industrial data associated with a first entity of the multiple customer entities with metadata to yield tagged data, wherein the metadata for a data item, of the items of the industrial data, identifies a data type of the data item and indicates whether the data item is sharable with one or more second entities of the customer entities; and distributing, based on the metadata, a portion of the tagged data from a first data silo, of the multiple data silos, to one or more second data silos of the multiple data silos accessible by the one or more second entities.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
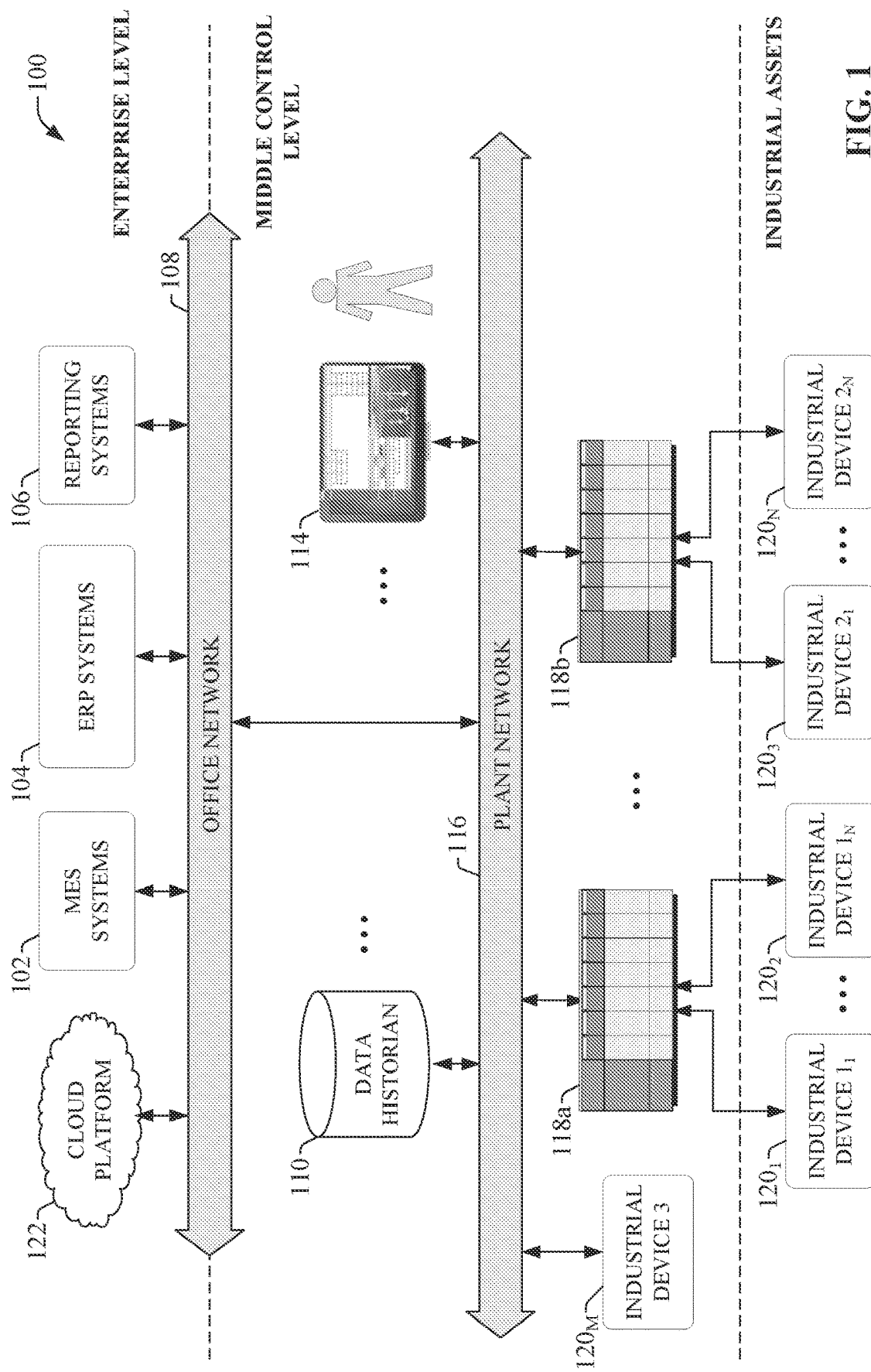
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. These programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller that executes on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices-including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 or on a cloud platform 122. These higher level systems can include, for example, enterprise resource planning (ERP) systems 104 that integrate and collectively manage high-level business operations, such as finance, sales, order management, marketing, human resources, or other such business functions. Manufacturing Execution Systems (MES) 102 can monitor and manage control operations on the control level in view of higher-level business considerations, driving those control-level operations toward outcomes that satisfy defined business goals (e.g., order fulfillment, resource tracking and management, asset utilization tracking, etc.). Reporting systems 106 can collect operational data from industrial devices on the plant floor and generate daily or shift reports that summarize operational statistics of the controlled industrial assets.

As cloud-based computing platforms become more widely available, industrial enterprises are exploring ways in which their operations can benefit by moving portions of their operations to the cloud. Moreover, the global scope afforded by cloud computing opens the possibility of multi-tenant industrial software that can serve multiple enterprises and users, and can assist in coordinating operations of multiple facilities or supply chain entities in different locations.

However, there are still many challenges that render wider implementation of cloud-based industrial solutions difficult, including data accessibility across data centers, security issues, data sharing concerns and limitations, and other issues. Some of these issues are due in part to certain architectural limits of current cloud platform architectures.

To address these and other issues, one or more embodiments described herein provide a multi-tenant, cloud-based Software-as-a-Service (SaaS) manufacturing platform that offers a variety of industrial applications to registered customers-including but not limited to MES, ERP, quality management, supply chain management, and customer relationship management (CRM)—as well as associated architectural features that address a number of issues relating to data sharing, security, scalability, and other concerns.

Figure 2:
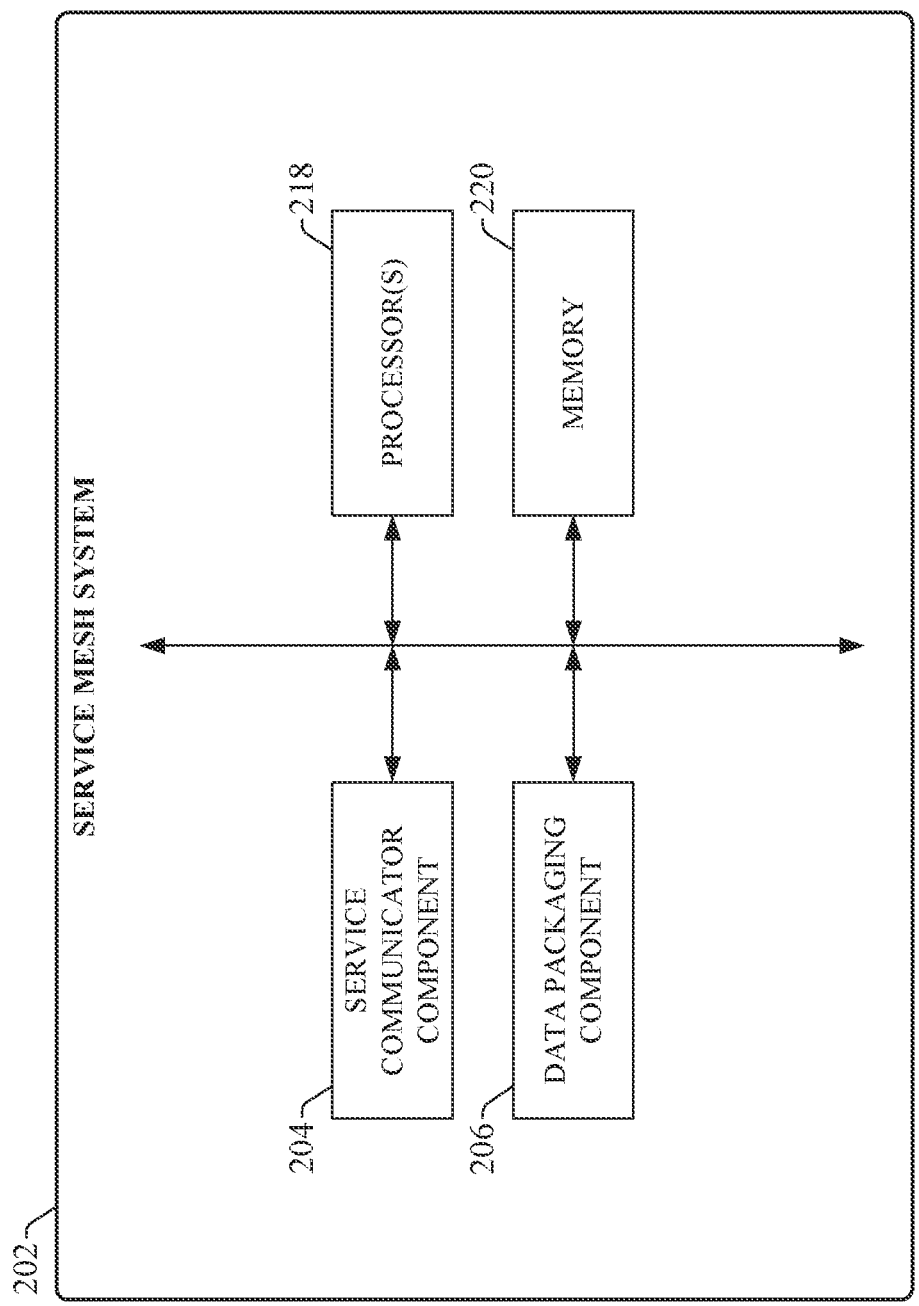
FIG. 2 is a block diagram of an example service mesh system.

FIG. 2 is a block diagram of an example service mesh system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Service mesh system 202 can be one of several systems, devices, or platforms that make up a service mesh of the industrial SaaS system—also referred to herein as the manufacturing cloud system-described herein. Service mesh system 202 can include a service communicator component 204, a data packaging component 206, one or more processors 218, and memory 220. In various embodiments, one or more of the service communicator component 204, data packaging component 206, the one or more processors 218, and memory 220 can be electrically and/or communicatively coupled to one another to perform one or more of the functions of the service mesh system 202. In some embodiments, components 204 and 206 can comprise software instructions stored on memory 220 and executed by processor(s) 218. Service mesh system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Service communicator component 204 can be configured to connect an edge device, a user interface, and an internal service of an industrial SaaS system, and can serve as a communicator for a data center. Packaging component 206 can be configured to package data as a deployment artifact that distributes metadata between data centers without requiring data replication. The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
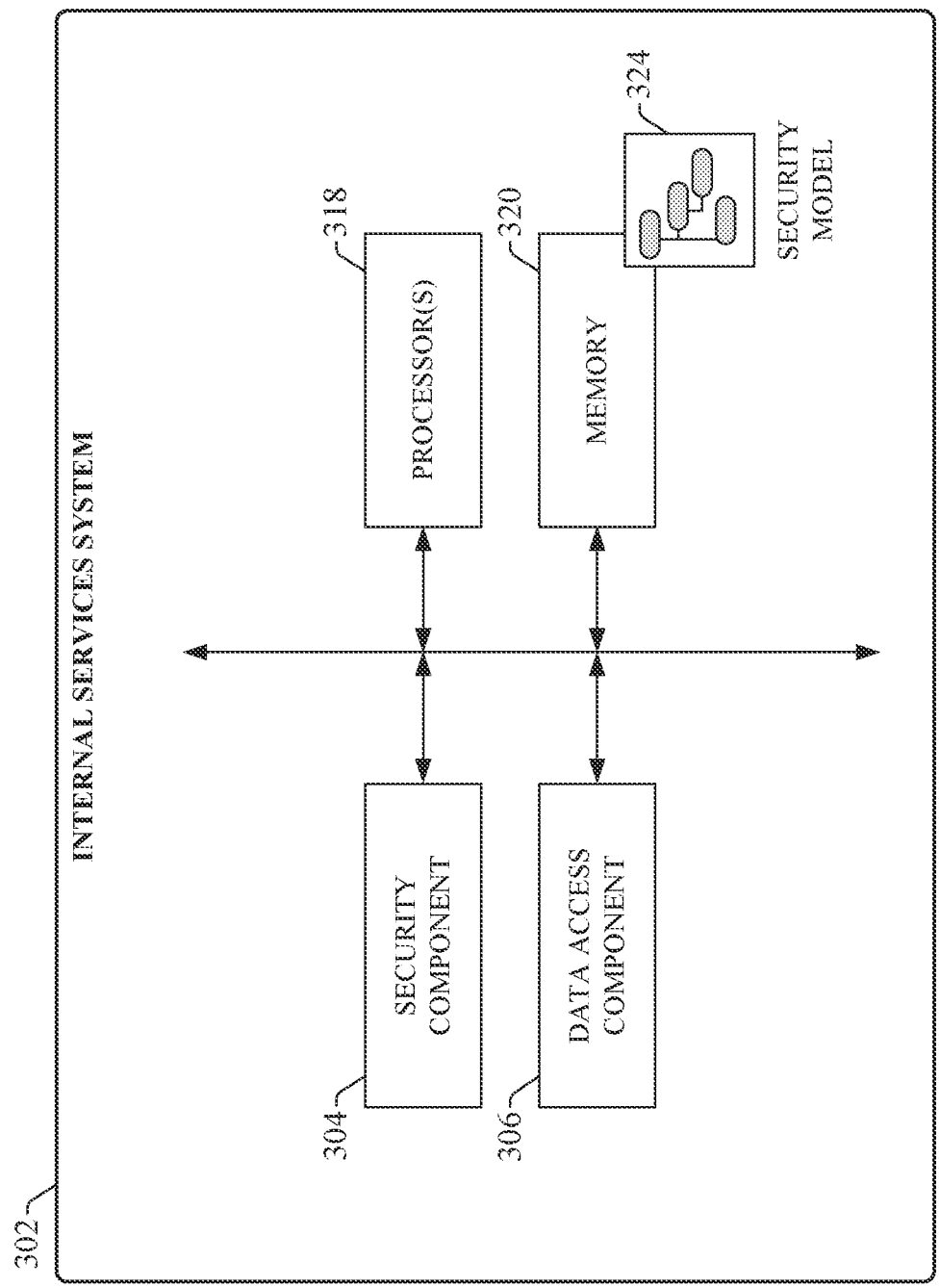
FIG. 3 is a block diagram of an example internal services system.

FIG. 3 is a block diagram of an example internal services system 302 according to one or more embodiments of this disclosure. Internal services system 302 can be one of several systems, devices, or platforms that execute internal services of the manufacturing cloud system described herein. Internal services system 302 can include a security component 304, a data access component 306, one or more processors 318, and memory 320. In various embodiments, one or more of the security component 304, data access component 306, the one or more processors 318, and memory 320 can be electrically and/or communicatively coupled to one another to perform one or more of the functions of the internal services system 302. In some embodiments, components 304 and 306 can comprise software instructions stored on memory 320 and executed by processor(s) 318. Internal services system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Security component 304 can be configured to define security levels associated with business processes and associated data, as well as contextual questions or rules that define different tiers of users who are permitted access to stored data. The security component 304 can define these security levels, questions, and/or rules as a security model 324. Data access component 306 can be configured to control access to sets of data based on the security levels and rules defined by the resulting model 324. The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
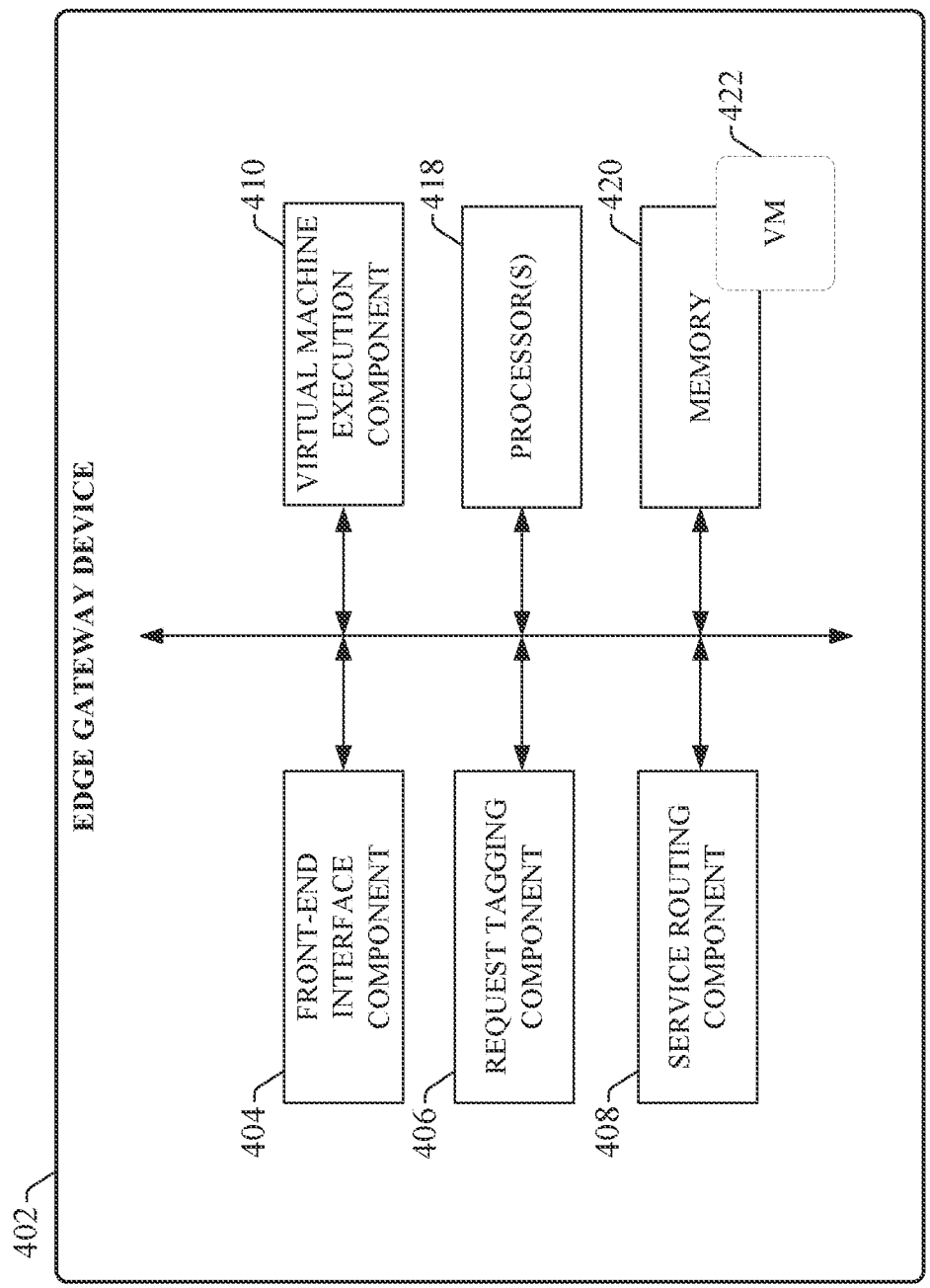
FIG. 4 is a block diagram of an example edge gateway device.

FIG. 4 is a block diagram of an example edge gateway device 402 according to one or more embodiments of this disclosure. Edge gateway device 402 can be one of several edge gateway devices of an edge layer through which customers or tenants can access to the manufacturing cloud system described herein. Edge gateway device 402 can include a front-end interface component 404, a request tagging component 406, a service routing component 408, a virtual machine execution component 410, one or more processors 418, and memory 420. In various embodiments, one or more of the front-end interface component 404, request tagging component 406, service routing component 408, virtual machine execution component 410, the one or more processors 418, and memory 420 can be electrically and/or communicatively coupled to one another to perform one or more of the functions of the edge gateway device 402. In some embodiments, components 404, 406, 408, and 410 can comprise software instructions stored on memory 420 and executed by processor(s) 418. Edge gateway device 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Front-end interface component 404 can be configured to interface with industrial devices and systems, client device, or other customer equipment and to exchange data with those customer-side devices and systems. Request tagging component 406 can be configured to tag a request received via the front-end interface component 404 with a tenant identifier and other metadata that can be used to facilitate routing of the request to the appropriate data center, region, or service. Service routing component 408 can route the request to the appropriate data center, region, or service based on part by the metadata added by the request tagging component 406. Virtual machine execution component 410 can be configured to execute a virtual machine 422 on the edge gateway device 402 that pushes applications to customer devices as artifacts or signed code, and that also receives and executes, on the edge-layer, applications or portions of applications from a manufacturing cloud system that executes on a cloud level.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
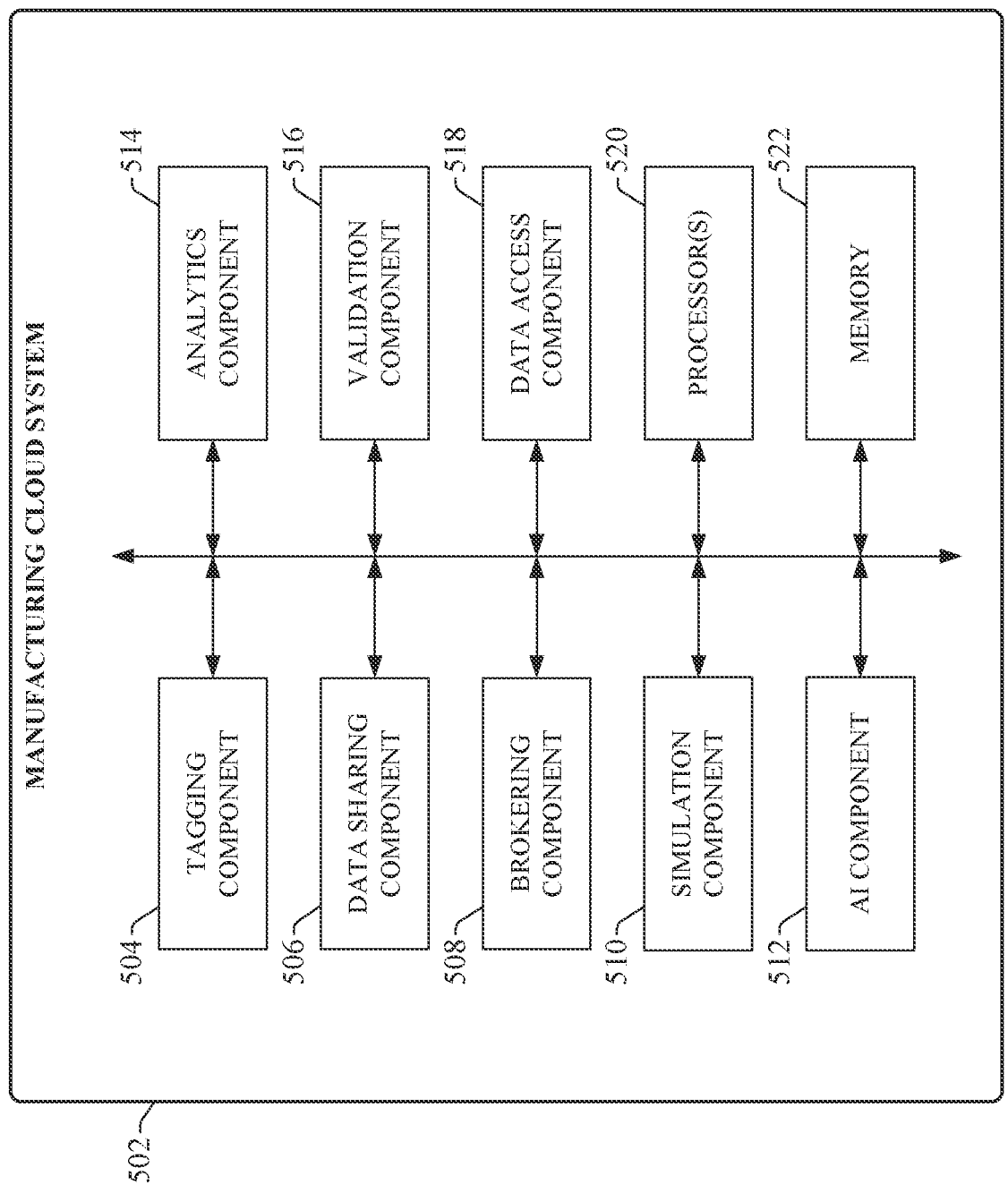
FIG. 5 is a block diagram of an example manufacturing cloud system.

FIG. 5 is a block diagram of an example manufacturing cloud system 502 according to one or more embodiments of this disclosure. Although depicted in FIG. 5 as being implemented on a single hardware platform, manufacturing cloud system 502 can be implemented on a distributed hardware and software architecture of a cloud platform—including data centers, internal services, edge gateway devices, service mesh layer components, and other such platform components—and can serve as a multi-tenant SaaS system that provides a variety of industrial software services to multiple customers. Manufacturing cloud system 502 can include a tagging component 504, a data sharing component 506, a brokering component 508, a simulation component 510, an AI component 512, an analytics component 514, a validation component 516, a data access component 518, one or more processors 520, and memory 522. In various embodiments, one or more of the tagging component 504, data sharing component 506, brokering component 508, simulation component 510, AI component 512, analytics component 514, validation component 516, data access component 518, the one or more processors 520, and memory 522 can be electrically and/or communicatively coupled to one another to perform one or more of the functions of the manufacturing cloud system 502. In some embodiments, components 504, 506, 508, 510, 512, 514, 516, and 518 can comprise software instructions stored on memory 522 and executed by processor(s) 520.

Tagging component 504 can be configured to tag data from a data silo based on the data's type and to assign, to the data, a designation indicative of the data's ability to be shared or allowable actions relative to the data. Data sharing component 506 can be configured to distribute the data tagged by the tagging component into groups based on data type. The brokering component 508 can be configured to perform brokering services based on the tagged and grouped data. The simulation component 510 can be configured to execute a simulation of industrial scenarios or operations based on a digital twin or other type of simulation-capable model. The AI component 512 can be configured to apply artificial intelligence (AI) to one or more functions of the system 502, including but not limited to applying AI to drive a customer's user interface toward an optimized layout or function suite, to predict production concerns, or to apply AI to other features of the system 502

Analytics component 514 can be configured to apply one or more types of analytics on customer data, digital twin simulations, or other aspects of the system 502. Validation component 516 can be configured to perform validation and integrity checks on customer systems. Data access component 518 can be configured to manage customer access to data generated and stored by the industrial applications executed by the manufacturing cloud system 502. The one or more processors 520 can perform one or more of the functions described herein with reference to the systems and/or methods disclosed. Memory 522 can be a computer-readable storage medium storing computer-executable instructions and/or information for performing the functions described herein with reference to the systems and/or methods disclosed.

Figure 6:
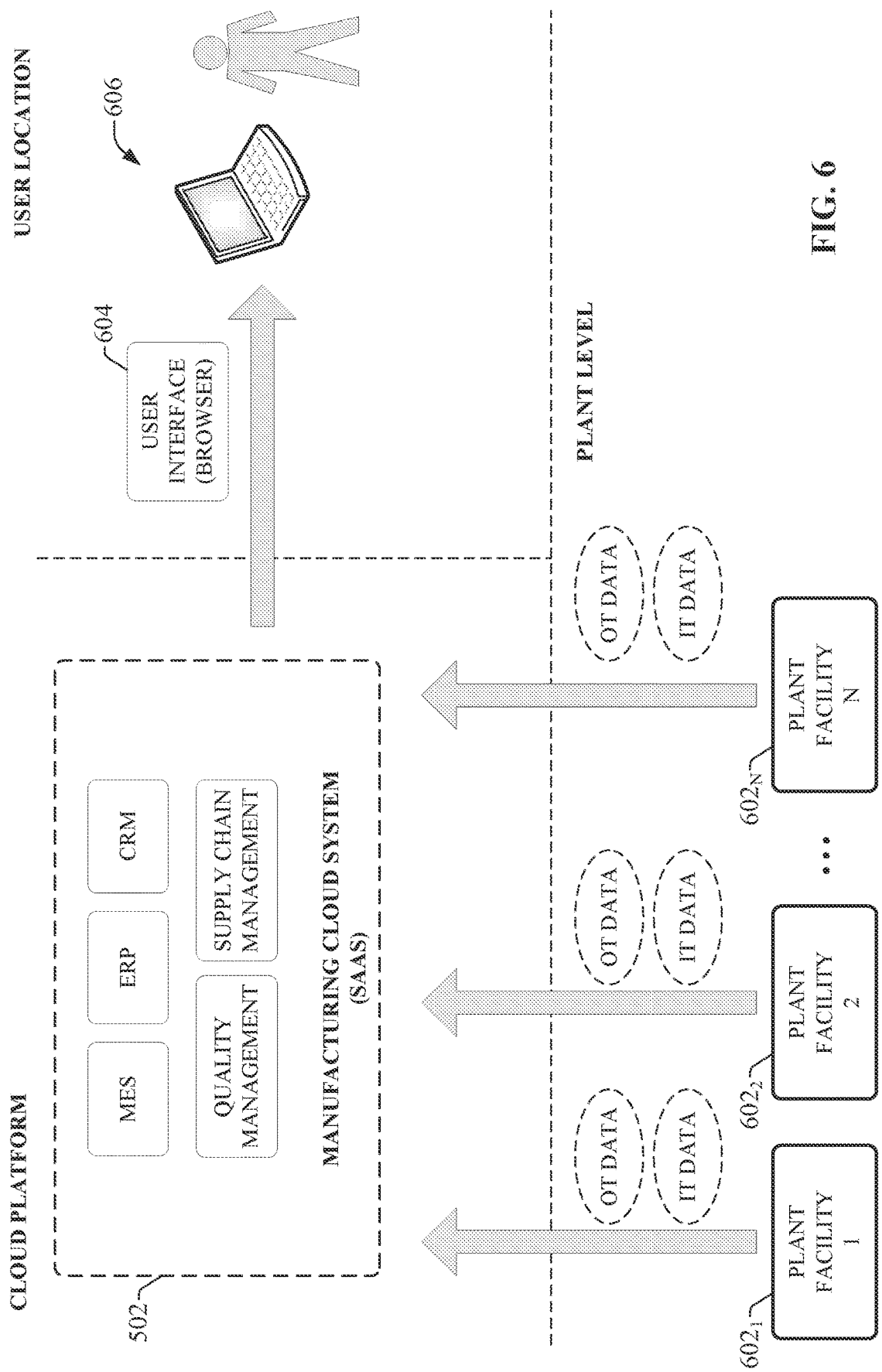
FIG. 6 is a diagram illustrating a high-level, generalized architecture of the manufacturing cloud system.

FIG. 6 is a diagram illustrating a high-level, generalized architecture of the manufacturing cloud system 502 according to one or more embodiments. In general, the manufacturing cloud system is a multi-tenant Software-as-a-Service (SaaS) manufacturing platform the executes on a cloud platform. The system 502 is accessible to multiple customers and offers a range of industrial solutions and applications, including but not limited to MES, ERP, customer relationship management (CRM), supply chain management, quality management, production monitoring, asset performance management (APM), and other such industrial applications. The system 502 can operate at scale and manages access to its services by a global base of customers across geographic boundaries. The system's customers can comprise different industrial enterprises, at least some of which may operate multiple geographically diverse industrial facilities 602. These customers can connect selected portions of their OT and IT systems to the manufacturing cloud system 502, and permit collection, storage, and analysis of selected sets of data from these systems by the industrial software services executing on system 502. The manner of processing, management, and storage of a customer's data depends on the types of manufacturing applications or services being used by the customer (e.g., ERP, MES, supply chain management, production monitoring and optimization, etc.), and may also be a function of the geographic boundaries between entities having a business relationship (e.g., different facilities owned by a common industrial enterprise, different customer entities of a supply chain, customer entities and supplier entities who provide parts or material to the customer entities, etc.).

Example manufacturing functions that can be carried out by the manufacturing cloud system 502 can include, but are not limited to, optimized production or work scheduling; analysis and improvement of process quality and repeatability; management of inventory (e.g., where inventory can comprises units of production, materials used in the manufacturing process, spare parts and devices, etc.); production management; assessing and maintaining compliance with industry regulations; data connectivity or sharing between supply chain entities or between facilities of an enterprise; trend analysis; digital and physical transaction tracking; automation of workflows; supply chain planning and optimization; lot traceability; real-time process visualization; or other such applications. Offering these services as cloud-based SaaS applications allows the services to be easily scaled to accommodate a global customer base, can simplify integration of these applications within customer facilities, and can remove the burden of maintaining on-premise manufacturing software from industrial customers. The system's multi-tenant model allows different customers to be logically grouped into tenants. Access to, and sharing of, customer-owned data is controlled by logical isolation of the tenants.

The manufacturing cloud system 502 offers customers visibility into their processes, or other information obtained based on analysis of customer's production data, via one or more custom user interfaces 604. In some embodiments, the system 502 can be accessed by authorized users via a web browser executing on the users' client devices 604, and the manufacturing cloud system 502 can render the user interface 604 on the client device 606 as a web-based interface. The formats of the interfaces 604, and the types of data presented, depend on the application in use, and can be at least partially customized based on applied AI, as will be described in more detail herein.

Figure 7:
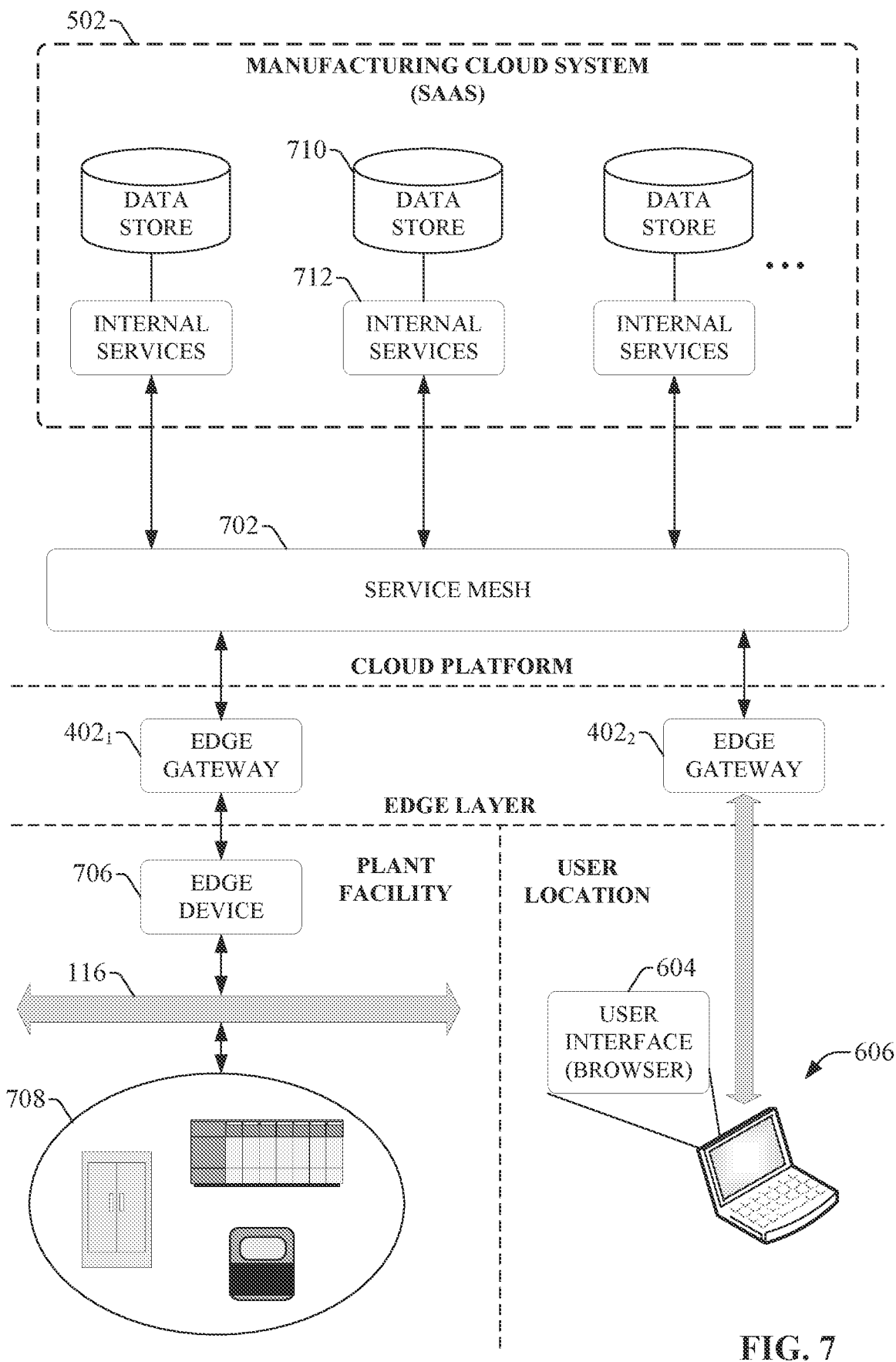
FIG. 7 is a diagram of a general architecture for implementing a manufacturing cloud system.

Various architectural and functional features of the manufacturing cloud system 502 intended to solve potential concerns associated with implementation of a scalable, multi-tenant, cloud-based industrial SaaS solution are described below. FIG. 7 is a diagram of a general architecture for implementing the manufacturing cloud system 502 according to one or more embodiments. In general, entities such as data sources 708 within plant facilities (e.g., industrial devices and systems, IT systems, etc.) as well as customer-owned client devices 606 can communicatively access the system 502 via an edge layer comprising edge gateway devices 402. In the example architecture of FIG. 7, industrial data sources 708 are interfaced with the edge gateway 402 via one or more edge devices 706 installed within the facility. However, some data sources 708 may interface with the edge gateway 402 directly without the use of an edge device 706, or may act as an edge device themselves. Example data sources 708 can include, but are not limited to, monitoring and control devices associated with industrial automation systems (e.g., industrial controllers and their associated I/O, motor drives, industrial robots, vision systems, etc.), as well as sources of IT data for the industrial enterprise (e.g., employee databases, purchase order systems, inventory tracking systems, billing and accounting systems, human resource management systems, etc.).

Figure 8:
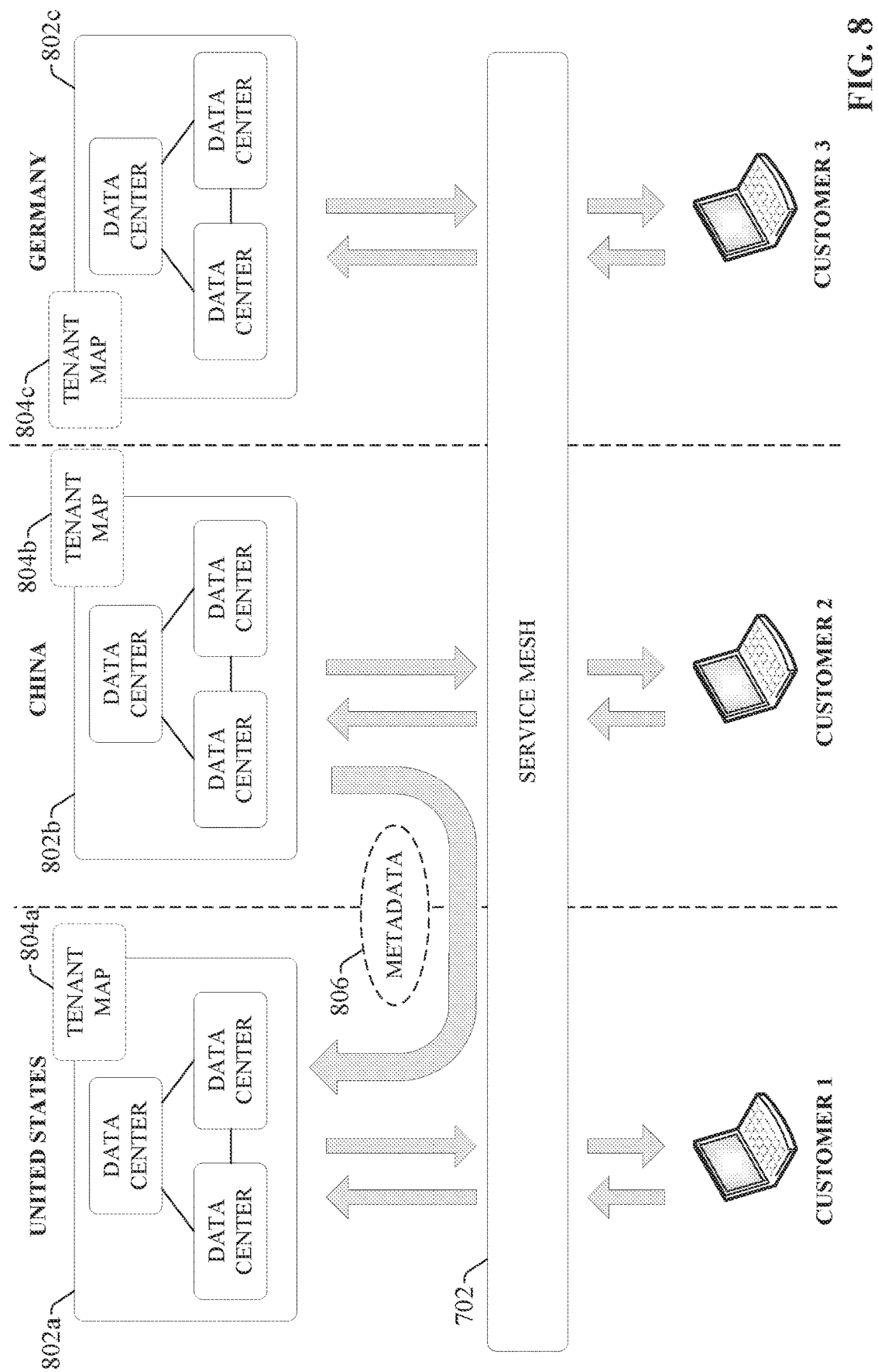
FIG. 8 is a diagram illustrating three example sets of data centers that located at respective three geographic locations, and which store data collected from, or generated for, multiple different customers of a manufacturing cloud system.

The manufacturing cloud system 502 itself can execute a number of internal services 712, and associated internal backup stores 710, in connection with operating and managing the industrial software services offered by the system 502. These internal services 712 can be segregated across multiple different data servers. The computing and data storage infrastructure for the manufacturing cloud system 502 can include multiple data centers that are distributed globally and which store data collected from the system's industrial customers as well as information generated by the system's manufacturing applications (e.g., MES, ERP, etc.) based on analysis of the customer data. FIG. 8 is a diagram illustrating three example sets of data centers 802 that located at respective three geographic locations, and which store data collected from, or generated for, multiple different customers of the manufacturing cloud system 502. Each set of data centers 802 may store and manage data for customers located in the same region, while selectively making the data available to users or customers in other regions if permitted.

The system's multi-tenant model allows different customers to be logically grouped into tenants. Access to, and sharing of, customer-owned data is controlled by logical isolation of these tenants. In some multi-tenant systems, data is made available to entities who are permitted to access that data-including the owners of the data as well as other entities having a business relationship with the data owner that permits those entities a degree of access to the data-via replication of the data across regions and data centers 802. However, in some cases there may be limits on the ability of a customer at one end of a data pipeline to access data residing in a data center 802 at another end of the pipeline. For example, to view data from a data center 802 in one location, users must be located in that region, especially for reporting purposes. To address this, contextual mapping can be used to enable reporting across an entire system, effectually breaking down walls between data centers 802.

To accomplish this, the edge gateway devices 402 of the edge layer, the user interfaces 604, and the internal services 712 of the system 502 can connect through a service mesh 702 (e.g., made up of one or more service mesh systems 202 or devices). This allows the internal services 712, which have their own internal backing stores 710, to divide across multiple data centers 802, with the service mesh 702 ultimately directing the communications between the internal services 712, edge gateway devices 702, and user interfaces 604.

The use of a service mesh 702 can also reduce or eliminate the need for data replication, since data stored at a data center 802 can be accessed by authorized users while remaining in that data center 802. Instead, the devices 202 of the service mesh 702 can package data to be shared as a deployment artifact comprising metadata 806 (e.g., metadata about the system, application, or workflow that produced the data), and route this metadata 806 to other data centers 802 as needed without the need for data replication, making the data available to customers or other authorized entities within the region in which those other data centers 802 reside. Sharing data between data centers 802 in this manner can eliminate potential data integrity and latency issues that are often associated with data replication. The system 502 can continue to meet minimal replication requirements for disaster recovery though high availability disaster replication.

In the case of data to be shared among customers or tenants who do not reside in a common geographical region, or if customers are divided across services and regions, the system 502 can make a determination as to whether the data is an enterprise-level or tenant-level concern, and provide this decision at the tenant level. The system 502 can maintain tenant maps 804 that define relationships between tenants of the system 502, including relationships between industrial customers and the various suppliers that supply parts, materials, or equipment to those customers. In general, the tenant maps 804 can define customer entities of various types-including but not limited to manufacturing entities, supplier entities, supply chain entities, warehouse entities, retailers, or other such entity types—as well as definitions of which of the entities are permitted to share data. The tenant maps 804 can also specify any limitations or conditions on sharing of data between the entities (e.g., an explicit indication of the types of data that are permitted to be shared, or types of data that are prohibited from being shared). The scope of data sharing permissions between customers can be defined explicitly by the tenant map data 804, or may be inherent based on the type of business relationship between two customers defined by the tenant map data 804 (e.g., a supplier/manufacturer relationship, a manufacturer/shipper relationship, a manufacturer/retailer relationship, etc.). The service mesh 702 can reference these tenant maps 804 to determine which tenants are permitted to access certain data sets, in connection with routing and sharing of data or metadata 806.

When a first customer entity requests to view or consume data belonging to a second customer entity (e.g., as a request to visualize the data via a user interface 604 for one of the manufacturing cloud system's services, or for consumption by an application owned by the first customer entity), devices 202 of the system mesh 702 can reference the tenant map 804 to determine the scope of data that can be shared with the first customer entity and perform any necessary redactions on the requested data prior to sharing to ensure that the first customer is provided only with a subset of the data permitted by the relationships and permissions defined by the tenant map 804, or to ensure that personal or otherwise proprietary information is not shared. The service mesh devices 202 can also perform smoothing on the data if appropriate (e.g., to remove outliers in time-series data).

The service mesh 712 can also manage data transfer between regions based on defined egress and ingress rules that define permitted and/or prohibited data boundaries. These rules can define, for example, that certain types or sets of data cannot be passed to data centers that are outside of the region in which the data resides. When the system 502 receives a request from a customer entity in a first region for data stored in a data center 802 of a second region, the devices 202 of the service mesh 702 can reference these egress or ingress rules to determine the scope of data that can be shared outside of the second region, and perform any necessary filtering or redactions on the requested data prior to sending the data to a data center 802 in the first region for access by the requesting entity. As described above, the resulting redacted data can be shared as a deployment artifact in some embodiments.

The approaches described above can be used to share data between geographically distributed facilities, which may exist in different regions but which may wish to share recipe data defining control process parameters for manufacturing a type of product or material, employee information, production statistics, device configuration data, or other such information.

Providing a service mesh 702 that manages routing of data or metadata 806 allows the manufacturing cloud system 502 to be unlimited in terms of where the system 502 can execute. Deployment options for various embodiments of the manufacturing cloud system 502 can include on-premise, shared multi-tenant, deployment within a customer's own tenant, or a hybrid deployment in which the system executes primarily on-premise but is managed from the cloud platform.

Figure 9:
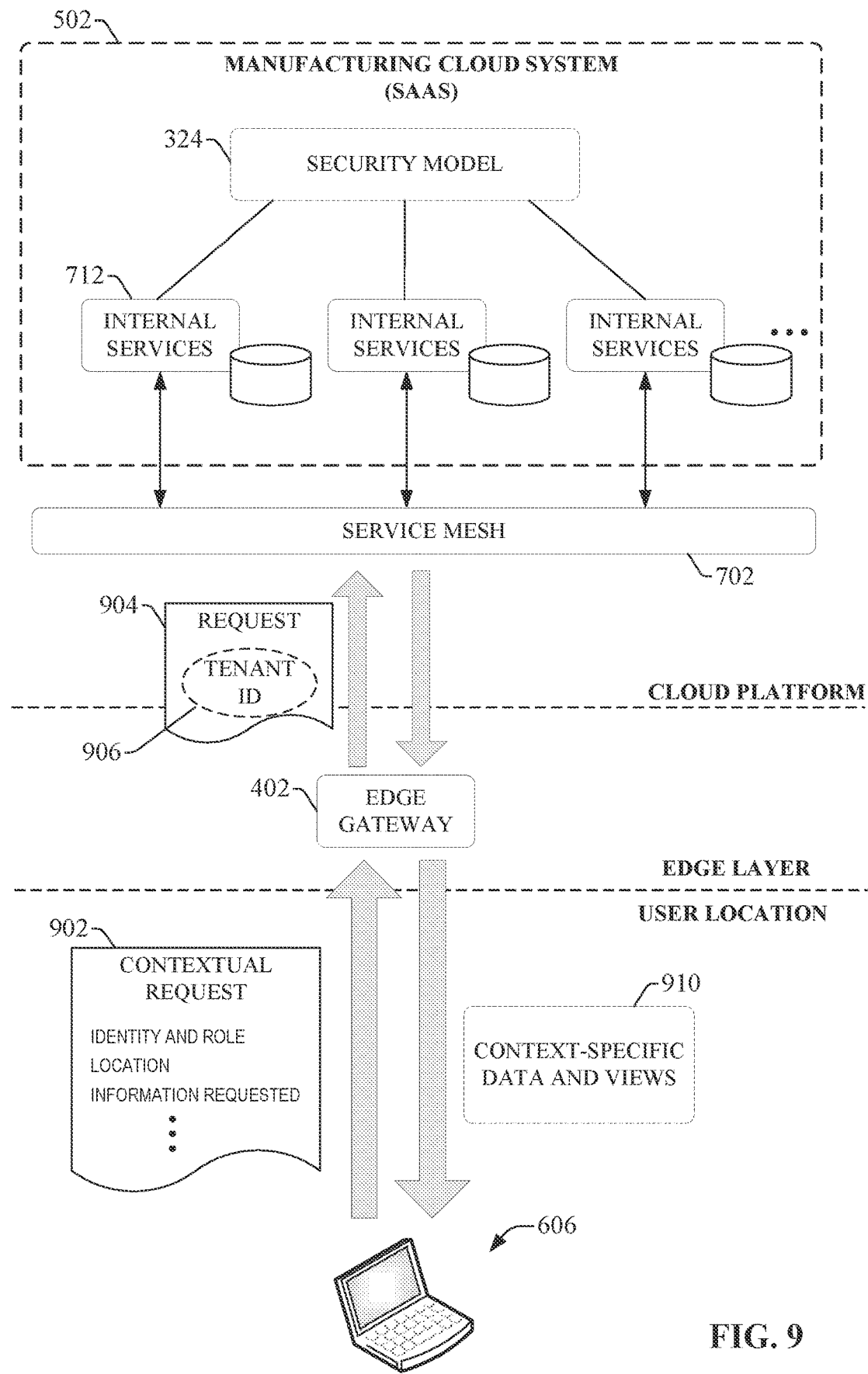
FIG. 9 is a diagram illustrating a general architecture in which a manufacturing cloud system uses a security model defining contextual rules to enforce model-based security.

In some embodiments, the manufacturing cloud system 502 can enforce model-based security actions that are focused around business processes and business data, and that manage secure access to data based on attributes and context of a user's current situation. FIG. 9 is a diagram illustrating a general architecture in which the manufacturing cloud system 502 uses a security model 324 defining contextual rules to enforce model-based security. In this example, one or more of the systems 302 (e.g., system 302 of FIG. 3) that execute the internal services 712 can include a security component 304 that defines contextual questions and rules defining different tiers of access to data stored by the system 502 at one or more of the data centers 802, as well as a data access component 306 configured to control access to sets of data based on the security levels and rules defined by the model 324. Rather than making a determination as to whether a requesting entity is permitted to access and view a requested set of data based on a binary decision-making consideration, the internal services 712 can process a request for data—e.g., a request received from a client device 606 via a user interface 604, or a request from an application— by first collecting contextual data pertaining to the request. The types of contextual information to be considered can be encoded in the security model 324, and can include, for example, an identity and role of the user requesting the data, a location of the user, information regarding a production-level event that occurred at an industrial facility from which the requested data originated within a defined time period before receipt of the request, or other such information.

The request for data, together with relevant contextual information required by the security model 324, can be submitted to the manufacturing cloud system 502 as a contextual request 902, and the internal services' data access components 306 (or the service mesh itself) can return the requested data (or data views) 910 only in response to determining that the contextual information contained in the request 902 satisfies criteria defined by the model 324. In some scenarios, the user interface 604 through which the request 902 is submitted can prompt the user for answers to any contextual questions required by the security model 324. Some items of contextual information required to resolve the data request can also be obtained by the system 502 from other sources, including but not limited the monitoring and control devices of an automation system relevant to the request, an employee data base (from which user identification or role data can be obtained), or other such sources.

The security model 324 can also define different tiers of users having varying levels of permission to data based on the users' specific positions within the management hierarchy. For example, the model 324 may permit users whose role is "Manager" to view portions of an employee's record while denying those users the ability to view the employee's social security number or other personal information. Meanwhile, users whose role involves managing payroll may be granted permission to view the employee's record while also being permitted to view a portion of the employee's social security number (e.g., the last four digits). Further up the management hierarchy, a user whose role is "Human Resources Administrator" may be assigned permission to view the entirety of the employee's record. Applying these decisions at the internal service layer, rather than at the presentation layer, can allow such security decisions to execute in a uniform manner across manufacturing cloud system's platform, and with the same classification data.

In some embodiments, the system 502 can also support delegation of access privileges from one user to another. For example, a first user with a first set of data access privileges—as defined by the security model 324—can instruct the system 502 to grant similar data access privileges to a second user who has not be expressly granted those privileges in the security model 324. The second user (the grantee) will then be afforded the same roles and data access permissions that the security model 324 has defined for the first user (the grantor), enabling the second user to access the same data and decisions as the first user. In some scenarios, this delegation of access privileges may only confer a partial or incomplete set of access permissions less than the total permissions afforded to the first user. For example, the delegation may prevent the second user from accessing the first user's account data. Moreover, the delegation may not grant access privileges to the second user that have been expressly denied to the second user by the security model 324.

In some embodiments, system security can be further strengthened by improving the definition of data boundaries. This can be achieved by redefining what a product does, as well as the product's capabilities and the data it holds, and mapping this to business processes (through application programming interfaces focused on process). This can establish the data boundaries needed to function properly.

In some embodiments, the manufacturing cloud system 502 can leverage blockchain technology in connection with recording access and manipulation of data stored by the system 502. The internal services 712 can use distributed ledgers to bifurcate security between authorization concerns and compliance concerns. For example, a first ledger may record which items of data a user viewed and any actions the user took relative to the data, while a second ledger may record the changes that were actually made to the data as a result of the user's actions. This information can be mirrored as useful data presented to customers so that those customers can satisfy their reporting and compliance requirements, while deriving useful insights from the data.

Some industrial automation platforms retain all data captured from an automation system or process. This method of data retention can become problematic as the captured data sets become increasingly voluminous, and may adversely affect performance, maintenance, and regulatory aspects of plant operations. To address these issues, one or more embodiments of the manufacturing cloud system 502 can archive the collected data, e.g., by sharding data of different data types, rather than retaining all captured data. According to this approach, rules can be established that dictate the retention times of data of respective different data types. The system 502 will maintain data values of each data type for a duration of time defined by the retention rules, and at the end of this retention time the values will either be archived or deleted.

To properly synchronize data that may need to be replicated, the system 502 can employ a database connectivity model in which the system's front-ends are minimally reliant, or do not rely, on knowledge of the back-end infrastructure in order to connect to databases. Instead, applications executing on a customer's client device 606 that are used to access the manufacturing cloud system's services may be designed without knowledge of the many databases that make up the storage architecture of the system 502 (and without the libraries and logic typically required to communicate with those databases), and the edge gateway devices 402 and service mesh 702 can manage the communication between the front-end and the back-end databases (e.g., via smart routing, facilitated in part by the tenant identifiers 906). The system 502 can handle more tenant-oriented connectivity out of process this way by incorporating a technology layer that handles the connectivity piece of the model that serves as a service mesh for routing or smart routing. Through international contracts, the system 502 can convert database tables that require replication into smaller services and place these services in a proper store, caching the services in different areas. Other solutions may involve additional caching in various regions (maintaining accessibility to the cached data through the global service mesh) or packaging and deploying the data as an artifact.

To facilitate smart routing of data requests in some embodiments, edge gateway devices 402 of the edge layer can include a request tagging component 406 (see FIG. 4) that decorates a data request 902 received from a user's client device 606 with a tenant identifier 906 that identifies the customer entity with which the user is associated, yielding an appended request 904. This tenant identifier 906 can be used by the devices 202 of the service mesh 702 to route the appended request 904 and any associate metadata to the appropriate data center 802, internal service 712, or region. This routing model can allow each data center 802 to function as a complete copy of the manufacturing cloud system software (or a complete copy of the infrastructure required to run pieces of the software), without the need to execute copies of the software elsewhere. The edge gateway devices 706 can tag requests 902 up front or apply the metadata in a way that will allow service mesh devices 202 to make decisions and send the appended request 904 to the appropriate locations.

There are many products-including analytic systems, reporting systems, visualization systems, or other such products—that remotely communicate with industrial automation systems. Connecting the bridge of communication between these products and the automation systems can be achieved through a fixed database, edge gateway, or a virtual machine. This typically requires any product that is consuming the system's database back-end resources to utilize large libraries in conjunction with applied complex logic. Shifting the communication into the gateway layer can eliminate the need to talk to these back-end services in order to route data to the data center 802 or database in which the data is going to be stored. Instead, providing authentication data can allow the system 502 to make decisions about data routing at its networking layer.

In some embodiments, the system 502 can also define contracts regarding how customers can communicate with the system in order to differentiate customer requests 902.

In scenarios in which a data request 902 requires presentation of multiple data sets residing at respective different geographical regions or nationalities, the data sets can be stitched into a common presentation by one or more of the edge gateway layer, the main graph services, or the service mesh 702. However, data residing in different countries may be subject to different legal parameters that dictate what types of data are permitted to be shared or transferred out of the country, or that place limits on sharing of personal information. In such cases, it can be useful to establish a definition of what constitutes personal data is under prevailing laws. To simplify this problem, customers may provide differentiators to assist the system 502 in determining what data is considered personally identifiable rather than requiring the system 502 itself to generate these identifiers.

The manufacturing cloud system 502 can expand data sharing between customers (tenants), between suppliers and customers, or between other entities in a supply chain to aid in supply chain processes. In an example use case, the system 502 can apply artificial intelligence (AI) and analytics to share upstream and downstream requirements among entities of a supply chain (e.g., suppliers, manufacturers, shipping entities, warehouse entities, distributors, etc.). These requirements can include, for example, current part or material inventory information, expected part or material requirements for satisfying a current demand for a product produced by a customer, work order information, or other such requirements. The system 502 can uses this shared information to forecast ripple effects in a supply chain. For example, the system 502 can determine how an event or status at one point in the supply chain (e.g., an inventory level, a demand level, a machine outage, a transportation delay, etc.) will affect another area of a customer's stream in terms of resource shortage or surplus. This can provide visibility into upstream and downstream impacts, and can also offer customers options for offloading part or material supply that they cannot use themselves (e.g., by identifying other entities who have a present demand for the parts or materials).

Figure 10:
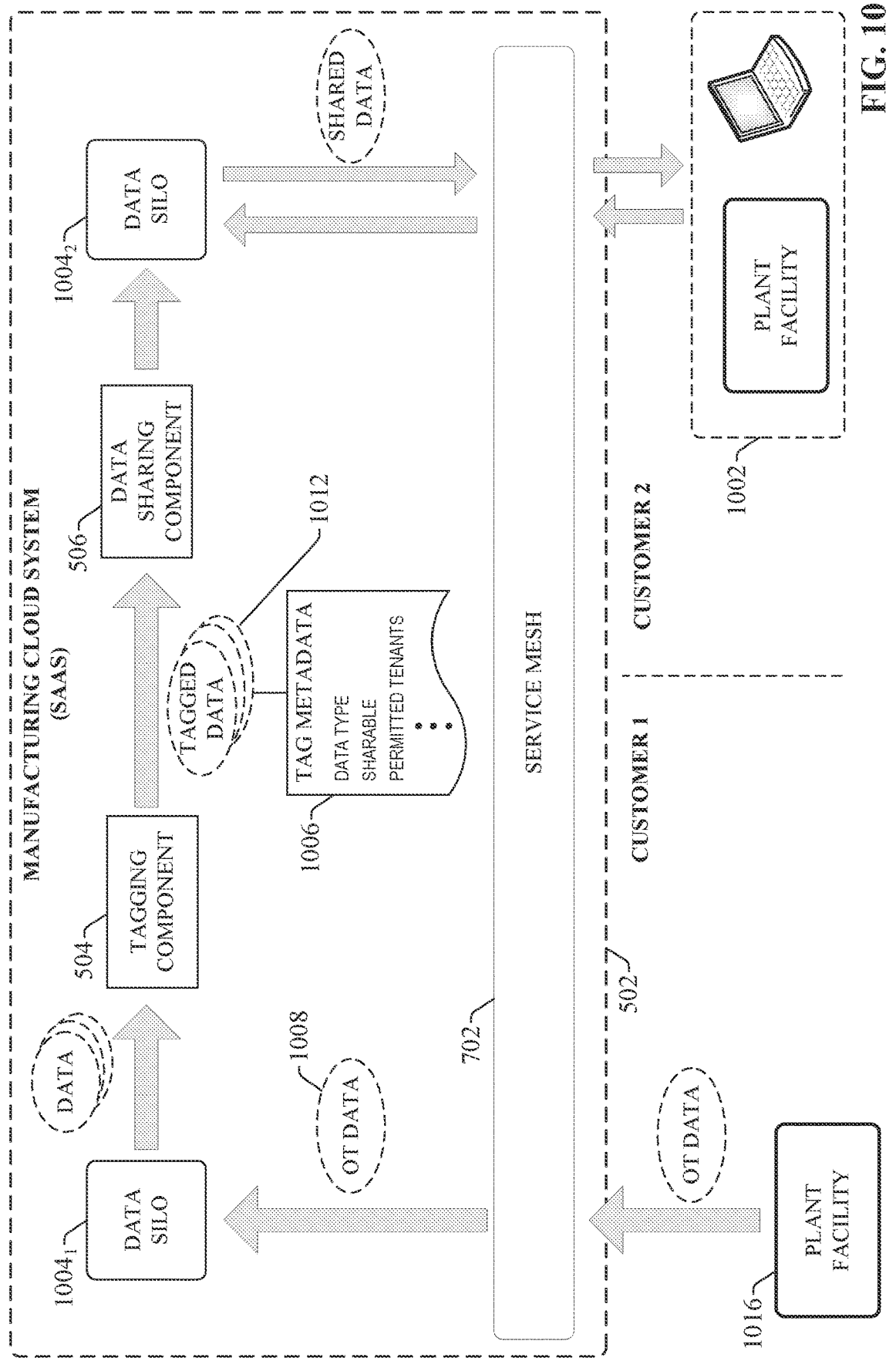
FIG. 10 is a diagram illustrating an example data tagging and aggregation operation that can be carried out by the system.

In order to serve as a data broker between customers, manufacturing cloud system 502 can separate out data from one data silo to another for the purposes of data aggregation, while also tagging the data based on its type. FIG. 10 is a diagram illustrating an example data tagging and aggregation operation that can be carried out by the system 502 in one or more embodiments. In this example, the system 502 can collect and store data 1008 generated by a first customer 1016 in a first data silo 10041. A tagging component 504 can tag items of this data 1008 with metadata 1006 identifying the data's type, as well as identifying whether the data 1008 is to be made sharable to other customers or tenants. In some cases in which the data is to be made sharable by a limited number of tenants, the metadata 1006 may also indicate the customers or tenants with whom the data 1008 is to be sharable. The metadata 1006 may also identify other allowable actions that may be performed on the data 1008. A data sharing component 506 can then distribute the resulting tagged data 1012 to one or more other data silos 10042 associated with other customers or tenants 1002 based on the data's type as indicated by the metadata 1008, or based on other information contained in the metadata 1006.

Figure 11:
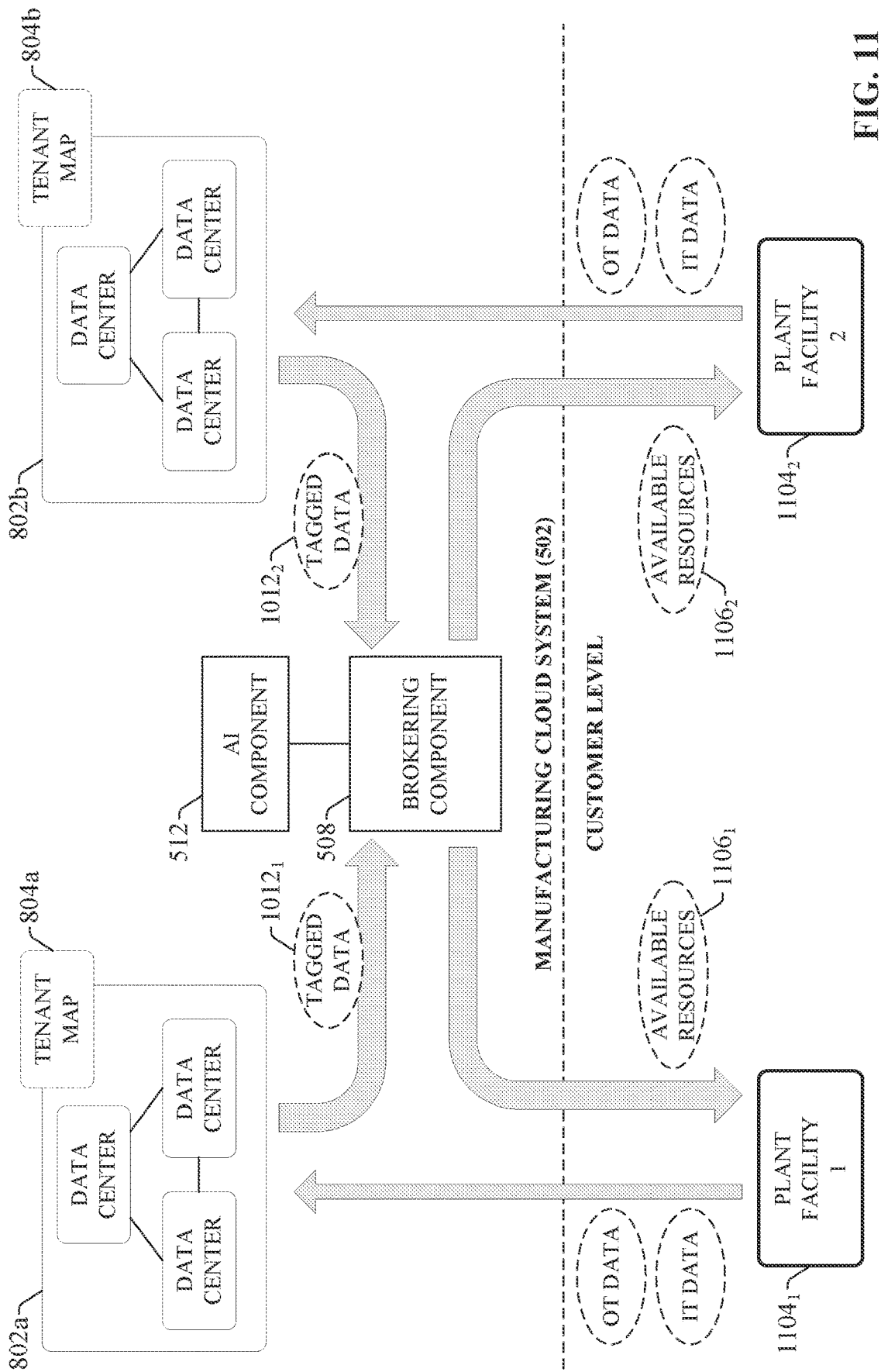
FIG. 11 is a diagram illustrating a generalized architecture for providing brokerage services by a manufacturing cloud system.

Tagging data 1008 based on the data's type and assigning it a designation of "shareable" or "non-shareable" can furnish the system 502 with tools for serving as a marketplace or service broker for customers. FIG. 11 is a diagram illustrating a generalized architecture for providing brokerage services by the manufacturing cloud system 502. In general, the system 502 can include a brokering component 508 that leverages the tagged data 1012 collected from multiple customers 1104 to broker sharing of resources between customers 1104. In an example scenario, sharable tagged data 1012 from a first customer 11041 (e.g., data indicating the customer's level of inventory of a given material) may indicate that that customer has a surplus of a material-due to overproduction, excessive inventory, or scrap-available for sale to other customers 11042 who need the material but cannot otherwise obtain the material due to supply chain issues or a problem encountered by material supplier. The brokering component 508 can determine, based on analysis of tagged data 1012, which customers have a surplus of a material as well as which customers have a need for the material, and provide customers 1104 who have a need for the material with information 1106 identifying other customers 1104 who have a surplus of the material. The brokering component 508 can also provide customers 1104 who have a surplus of the material with information identifying other customers 1104 who currently have a need for the material or are otherwise in the market to purchase the material.

When providing such brokering information to providers or consumers of a resource, the brokering component 508 will only share data that has been tagged as being sharable by the owner of the data. In some embodiments, the brokering component 508 can also test the available material against one or more metrics defined by the potential buying customer to ensure that that the material satisfies the buyer's standards of quality, and can include this information as part of the notification sent to the buyer.

In some embodiments, the system 502 can leverage blockchain technology, including distributed ledgers and smart contracts, in connection with these brokerage services. For example, the system 502 can program rules or agreements between the resource provider and the resource purchaser in connection with the resource transaction as a smart contract stored and executed on a blockchain. The system 502 can also record results of the tests performed by the brokering component 508 on the resource in a distributed ledger, including degrees to which the resource satisfies the metrics defined by the buying customer.

The brokerage services offered by embodiments of the manufacturing cloud system 502 can be used to broker substantially any type of resource between manufacturing or supply chain entities, including but not limited to units of a product, material or parts used to manufacture a product, energy credits, or other such resources. Sharing of labor resources can also be brokered in this manner. For example, some tagged data 1012 can comprise statistics regarding the available work forces at respective different customers, including information about the skills and work schedules of employees at those customer facilities. On the demand side, tagged data 1012 can also include information about different customer's current or predicted labor needs. The brokering system 508 can apply brokering analytics to this data 1012 to determine whether a first customer has a surplus of a certain type of labor force and can therefore offer staffing to a second customer having a current or predicted future demand for this type of labor. The system 502 can anonymize information as needed when sharing labor information between customers or tenants. Industrial equipment or other resources can also be brokered by the system 502 in this manner.

The brokering component 508, in conjunction with the AI component 512, can identify brokerage opportunities across substantially any time scale. This can include predicting a future time at which a shortage of a resource is expected to be experienced by a first customer entity, and predicting availabilities of that resource for one or more other customer entities at that future time. These predictions are based on analysis of the tagged data 1012, which can include production data, human resource data, work schedule data, work order data, inventory data, transportation scheduling data, or other types of data relevant to determining shortages and surpluses of resources. The brokering component 508 can factor transportation schedules into the brokering process, such that a surplus resource owned by a first customer is only considered available to a second customer at a required time only if transportation means are available for delivering the resource to the second customer at the resource is needed.

Some industrial automation platforms provide broad system access using deliberately designed application programming interfaces (APIs) and contracts. Typically, as a system moves closer to the edge layer, this method becomes impractical. A middleware solution between systems can enable customers and partners to achieve required tasks, allowing the system 502 to capture to known scenarios. Modeling the manufacturing cloud system products as if they are meant to be APIs can be key to accessing a broad integration layer that is highly adoptable and successful.

Figure 12:
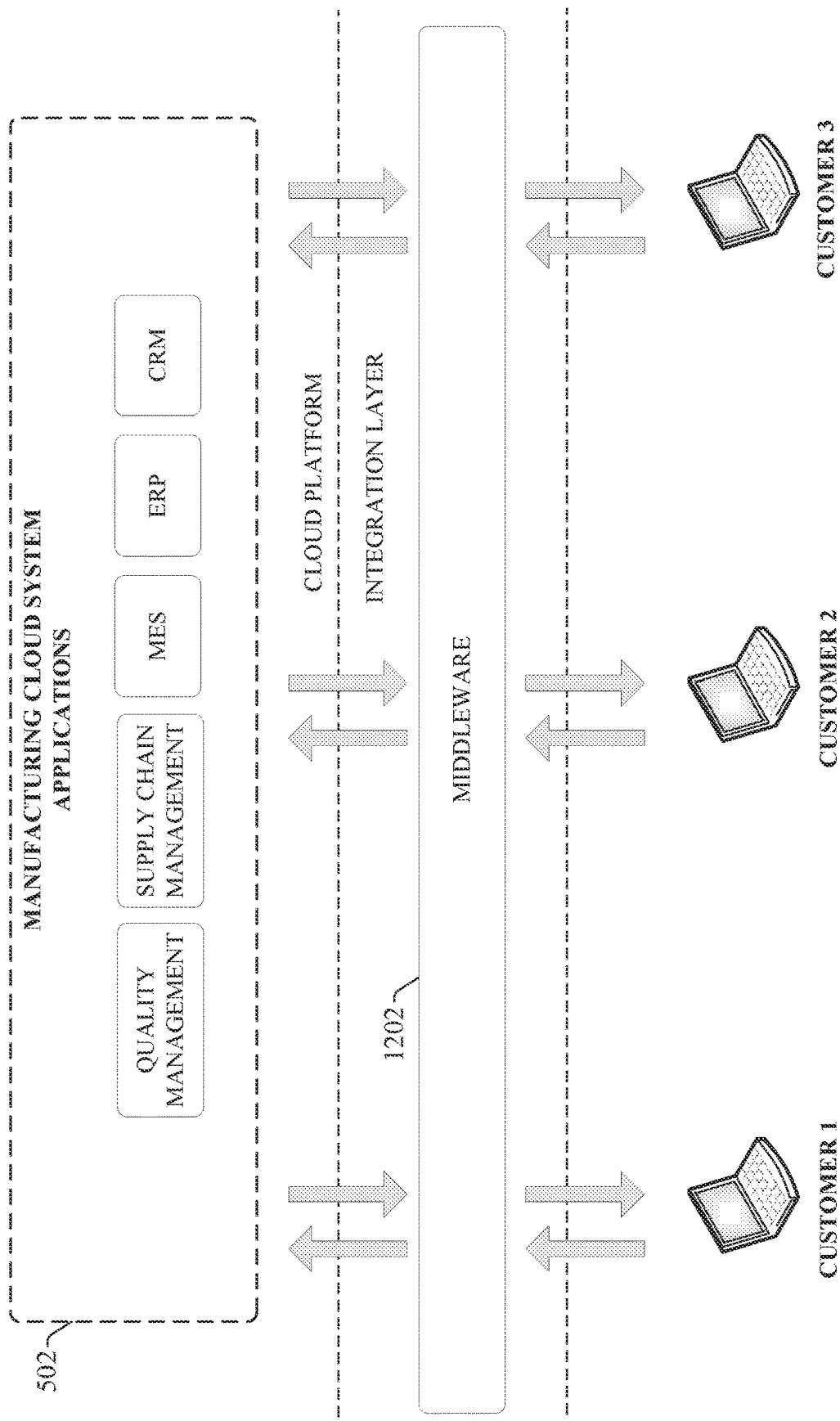
FIG. 12 is a diagram illustrating an example architecture in which a manufacturing cloud system uses middleware as an SaaS offering in the integration layer to provide system access.

Another solution is to utilize middleware as a SaaS offering. FIG. 12 is a diagram illustrating an example architecture in which the manufacturing cloud system 502 uses middleware 1202 as an SaaS offering in the integration layer to provide system access. Middleware 1202 can be developed as an API and configured to act as a middleware application that serves an extensible and scalable means for customers to access the applications made available by the system 502. The system 502 can include internal services 712 that achieve this (represented by one or more data access components 518; see FIG. 5).

According to another architecture for providing broad system access, particularly if low-level, data-oriented integration of the system 502 is desired, domain graph services having well-modeled query language, such as GraphQL, can be used for a portion of the communication, while the middleware 1202 manages the rest.

In order facilitate a greater degree of offline functionality such that connectivity between customers' automation systems and the manufacturing cloud system 502 need not be continuous, the system 502 can push some of its functionality to the network edge layer (e.g., for execution on one or more edge gateway devices 402).

Figure 13:
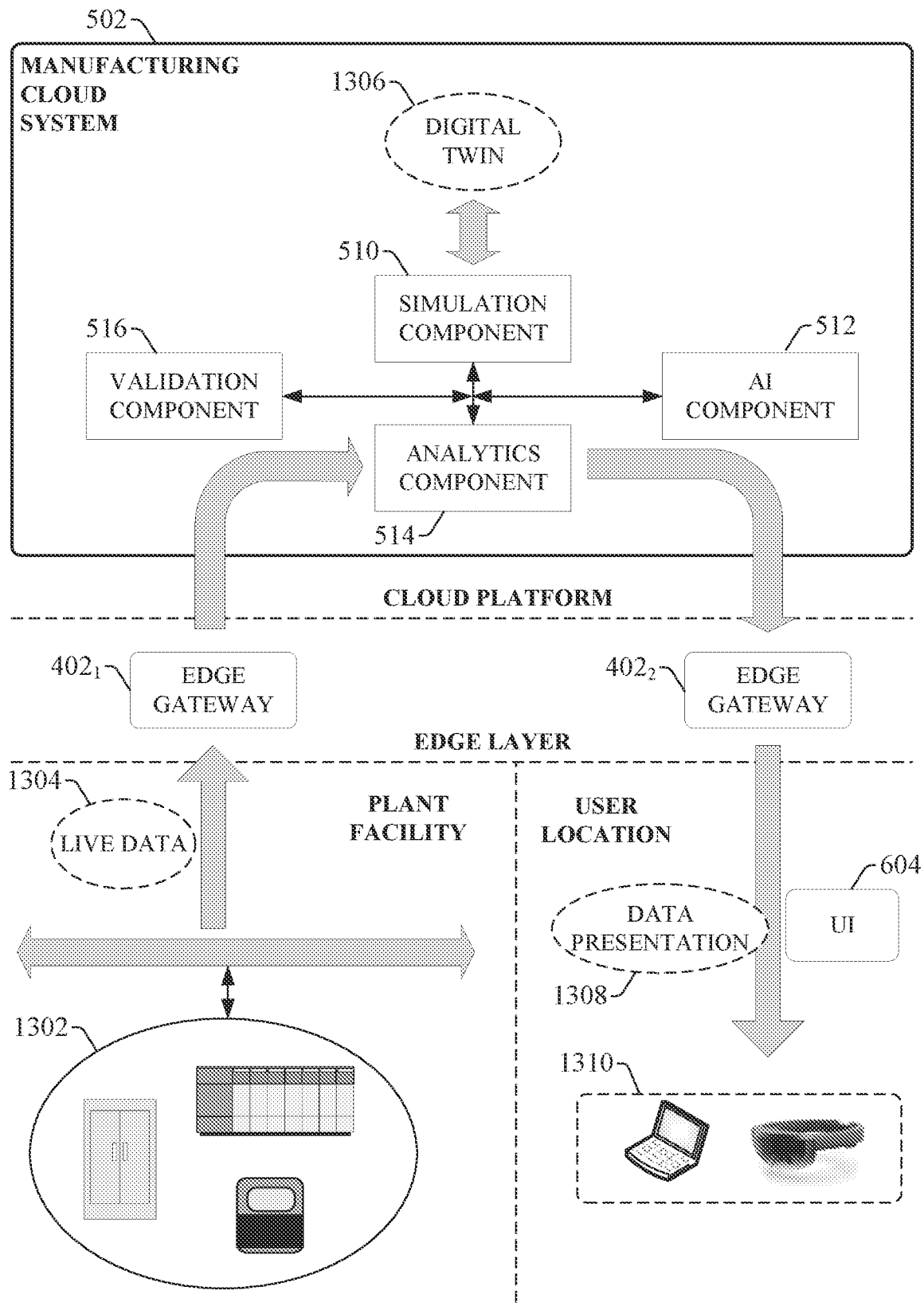
FIG. 13 is a diagram illustrating a general architecture in which a manufacturing cloud system collects and analyzes data from customers' data sources, and provides data presentations to client devices of authorized users based on this analysis.

FIG. 13 is a diagram illustrating a general architecture in which the manufacturing cloud system 502 collects and analyzes data 1304 from customers' data sources 1302 (e.g., the monitoring and control devices of the customers' automation systems or industrial processes, business-level or IT systems, etc.), and provides data presentations 1308 (e.g., presentations rendered on user interfaces 604 or virtualized presentations) to client devices 1310 of authorized users based on this analysis. In some embodiments, the manufacturing cloud system's analytics component 514 can leverage industry knowledge in connection with resolving issues for customers. This can include making intelligent inferences regarding the outcome of a process based on detected events that occurred upstream or downstream from the process. In an example scenario, the system 502 can generate and deliver a notification informing plant personnel that a particular task was not completed, or is predicted to fail to complete, based on knowledge that a supplier entity did not have the necessary inventory to complete the task. Other types of status information that can be inferred using applied AI can include, but are not limited to, expected machine downtimes, an expectation that a pending order for a product will not be fulfilled within a required time, a time of completion of a manufacturing process, or other such statuses. Inferring a status of a process based on events that occur upstream or downstream relative to the process can reduce the need for the process itself to be continuously connected to the system 502 in order to ascertain its status. If the system 502 makes an incorrect inference about the process, users can provide post-facto feedback to the system 502 to improve the analytic model used to infer the process's status. The system 502 can also support strong redundancy features that allow greater tolerance for offline operation.

The system 502 can also support customers' ability to execute their own validation and integrity checks on their own systems or applications, even if connectivity to the system 502 is down. This may involve moving certain functions down to the edge layer for execution on edge gateway devices 402. The system 502 can allow customers to work offline, and to perform system validations, during periods when maintenance is required.

Figure 14:
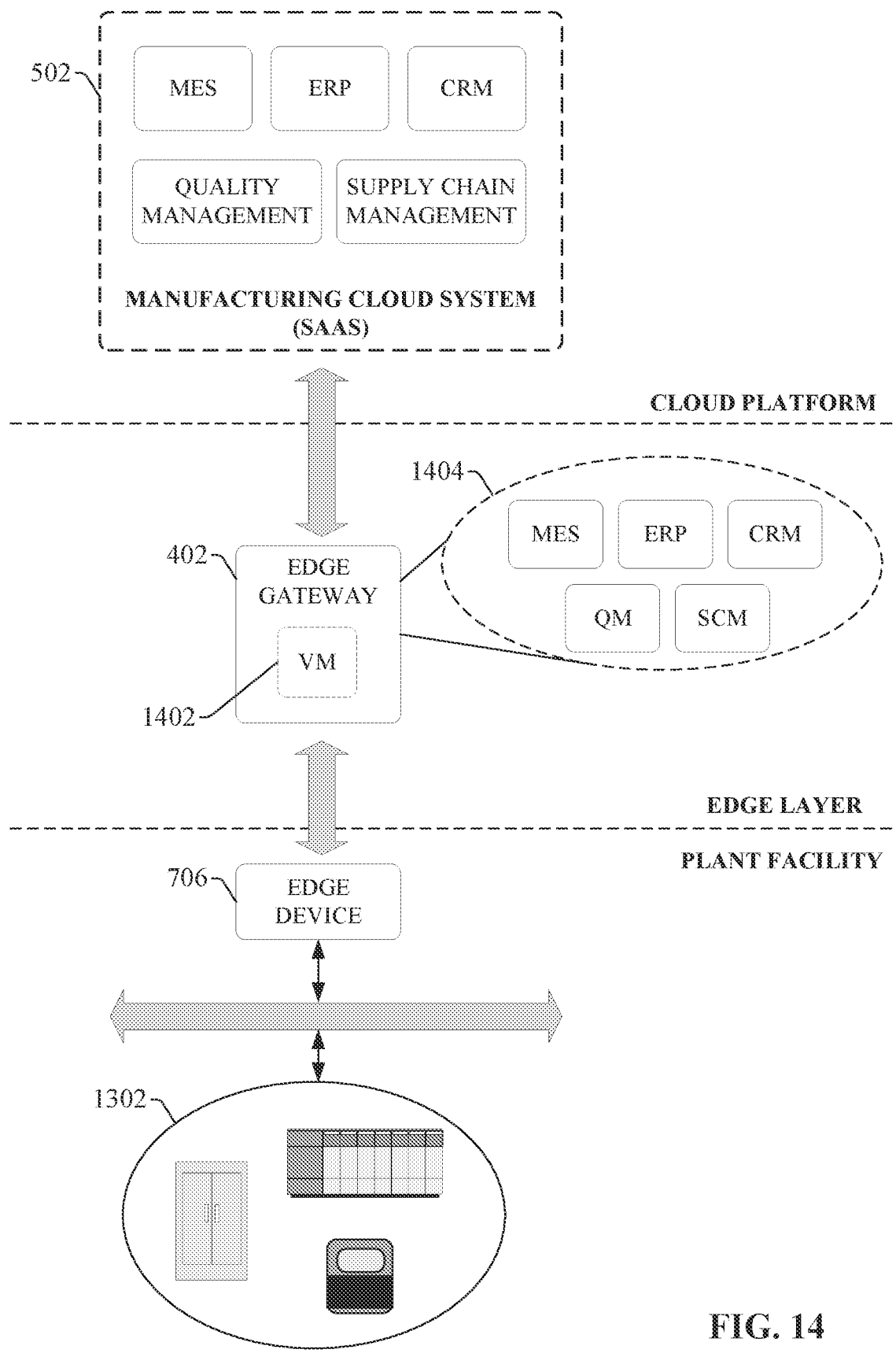
FIG. 14 is a diagram illustrating an example architecture in which an edge gateway device executes one or more virtual machines that allow a manufacturing cloud system to push selected applications to the edge gateway device for edge-level execution.

To enable selected manufacturing cloud system functions to be pushed to and executed on the edge level, the system 502 can deploy and maintain the edge gateway device's software so that gateway applications are kept up to date and capable of receiving code from the system 502 for edge-level execution. As an alternative to traditional methods of informing customers that their system is out of date—e.g., by notifying customers that a software update is available and asking customers to install the update themselves—the edge gateway devices 402 can execute virtual machines (VM) that will allow the system 502 to push applications to customers as artifacts (e.g., to push updates to applications or functions that are running on the edge gateway devices). FIG. 14 is a diagram illustrating an example architecture in which an edge gateway device 402 executes one or more virtual machines 1402 that allow the manufacturing cloud system 502 to push selected applications 1404 to the edge gateway device 1404 for edge-level execution. These applications 1404 can include applications or micro-applications that perform portions of the functionality of the manufacturing cloud system application being used by the customer (e.g., ERP, MES, quality management, etc.). The system 502 can also push operating system updates to the edge gateway devices 402 as needed.

The virtual machine 1402 can also be used by the system 502 to download signed code (e.g., binary blocks) to client devices or industrial devices associated with their customers. In some cases, this can be directed by the customers themselves. For example, a customer that operates multiple manufacturing facilities may wish to configure multiple automation systems with the same production recipe or device configuration, and can use the system 502 to send this configuration or recipe information to the appropriate customer devices via the edge gateway devices 402 running virtual machines 1402.

Returning to FIG. 13, some embodiments of the manufacturing cloud system 502 can leverage the metaverse to provide, as data presentation 1308, a virtualized presentation of the customer's plant floor operations, which can be rendered on a client device 1310 capable of rendering a virtual reality presentation (e.g., a wearable appliance or a hand-held device capable of displaying a virtual presentation in a flat-screen format). In some embodiments, the system 502 can build and render these virtual presentations based on analysis of the customer's live production data 1304 (which can convey the current statuses and behaviors of the industrial equipment that make up the customer's production environment) as well as simulation, by simulation component 510, of a digital twin 1306 or another type of digital model of the customer's industrial systems.

In some cases, some industrial processes performed by a customer's automation systems may be sufficiently consistent that the virtual presentation can be executed for durations of time based solely on simulation of the digital twin 1306, without the need for updated data 1304 from the plant floor during these durations. To account for variations between the simulated performance used to drive the virtual presentation and the real performance of the physical automation systems, the simulation component 510 can occasionally synchronize with the physical system (e.g., on a periodic basis or in response to a defined synchronization trigger) by reading current values of live data 1304 and updating the simulation—and the virtual presentation being generated based on the simulation—based on these values. That is, the system 502 can update the visual presentation delivered to the user's client device at a frequency that is greater than than a frequency at which the simulation synchronizes its state with that of the physical automation system based on the live data 1304. During the periods between synchronization events, the system 502 updates the virtual presentation based solely on the simulation of the digital twin 1306 without the need for updated live data 1304. In some embodiments, the AI component 512 can apply AI to the simulation in order to infer the current states of the automation systems between synchronization events.

Also, one or both of the analytics component 514 or the AI component 512 can perform analytics on the simulation during its execution in order to obtain insights into the customer's processes, and to generate reports or recommendations based on this analysis. In some embodiments, the system 502 can allow users to leverage this approach to test different possible control scenarios, system configuration options, or production options being considered. For example, the customer may wish to learn estimated effects of a proposed modification to a device configuration, production schedule, or control sequence. The simulation component 510 can simulate the proposed modifications using the digital twin 1306—with the proposed modification in place—and the analytics component 514 or the AI component 512 can analyze the simulation to determine the expected effects of the modification, which can be reported to the user as a data presentation 1308. The proposed effects may reported in terms of one or more specific metrics, such as expected product throughput, machine downtime, energy consumption, effects on other processes being carried out in the plant facility, or other such metrics.

In some embodiments, the AI component 512 can also use applied AI to automatically customize the user interface 604 that is delivered to a customer based on usage and the customer's data, yielding a more efficient user interface that is better suited to the customer's workflows and preferred applications. AI component 512 can also deliver proactive notifications or other information to a customer regarding their automation systems and processes based on application of AI to the customer's data 1304. This can include, for example, using applied AI to predict when a customer should re-order a particular part or material used in a manufacturing process based on analysis of usage rates, production schedules, expected supply chain issues, and other such factors. The system 502 can also apply AI to monitored user interactions with the user interfaces, or selected subsets of the tagged data 1012, to determine an optimal frequency for delivery of such notifications, as well as what types of events should trigger a notification. This can include customizing the types and frequencies of events for different users within an industrial enterprise to differentiate a user's perception of a notification event based on that person's role, history of action relative to the type of the event, or other such criteria.

Industrial customers' operations often include systems, such as quality or manufacturing processes, that must be validated to ensure that those processes are expected to operate accurately and safely. Some embodiments of the manufacturing cloud system 502 can allow users to define their own validation routines or standards to be applied to their processes, and will incorporate those customer-defined validation routines into its own testing suite for deployment on the customer's systems.

The manufacturing cloud system 502 can also assist customers in managing different versions of their system or process software by offering customers a buffer before requiring them to update their systems. In some cases, this can be an "n–2" buffer in which the system 502 continues to support the customer's currently installed system version until that version is two updates behind the latest version, trailing the customer's current version until the system has had time to validate.

Determining with certainty which version of software a customer is currently running on their systems can be challenging, and is complicated by the fact that inactive code is not considered to be active production code even if it is in production. To address this issue, some embodiments of the manufacturing cloud system 502 can use decompressed internal services to provide customers with published reports of their systems that identify aspects of the customer's systems that have changed relative to a previous point in time. These reports can also include results of validation tests or other such information, providing information that customers can use to adapt to the results of the tests.

Some manufacturing facilities utilize metal bar codes as a primary source of labelling units of product or material for tracking purposes or lot traceability. These metal bar codes are scannable optical codes that translate to unique identifiers for each unit being tracked. However, E-ink labels in combination with a radio frequency identification (RFID) chip can also be used to automate the tracking of the movement of material. These methods can also be paired with automated guided vehicles (AGVs) on the shop floors to fully automize the tracking process. In some embodiments, the manufacturing cloud system 502 can integrate this part tracking process with augmented reality, allowing customers to bypass the need for E-ink labels altogether.

In some embodiments, the manufacturing cloud system 502 can expand its tools to other platforms, allowing customers to access the system's work center from their phones or using Bluetooth beacons. This can allow the system 502 to generate and deliver, to the customer's client devices, real time status updates for processes that are in physical proximity to those client devices. In such scenarios, the system 502 can identify when a user's client device has moved within a defined distance from an automation system or process from which the system 502 is collecting status and operational data. The system 502 can further determine whether the user has an identity or role known to have an interest in the process being carried out by the automation system. If so, the system 502 can render a filtered or summarized set of status information for the automation system on the user's client device as a data presentation 1308.

FIGS. 15-19 illustrate various methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 15:
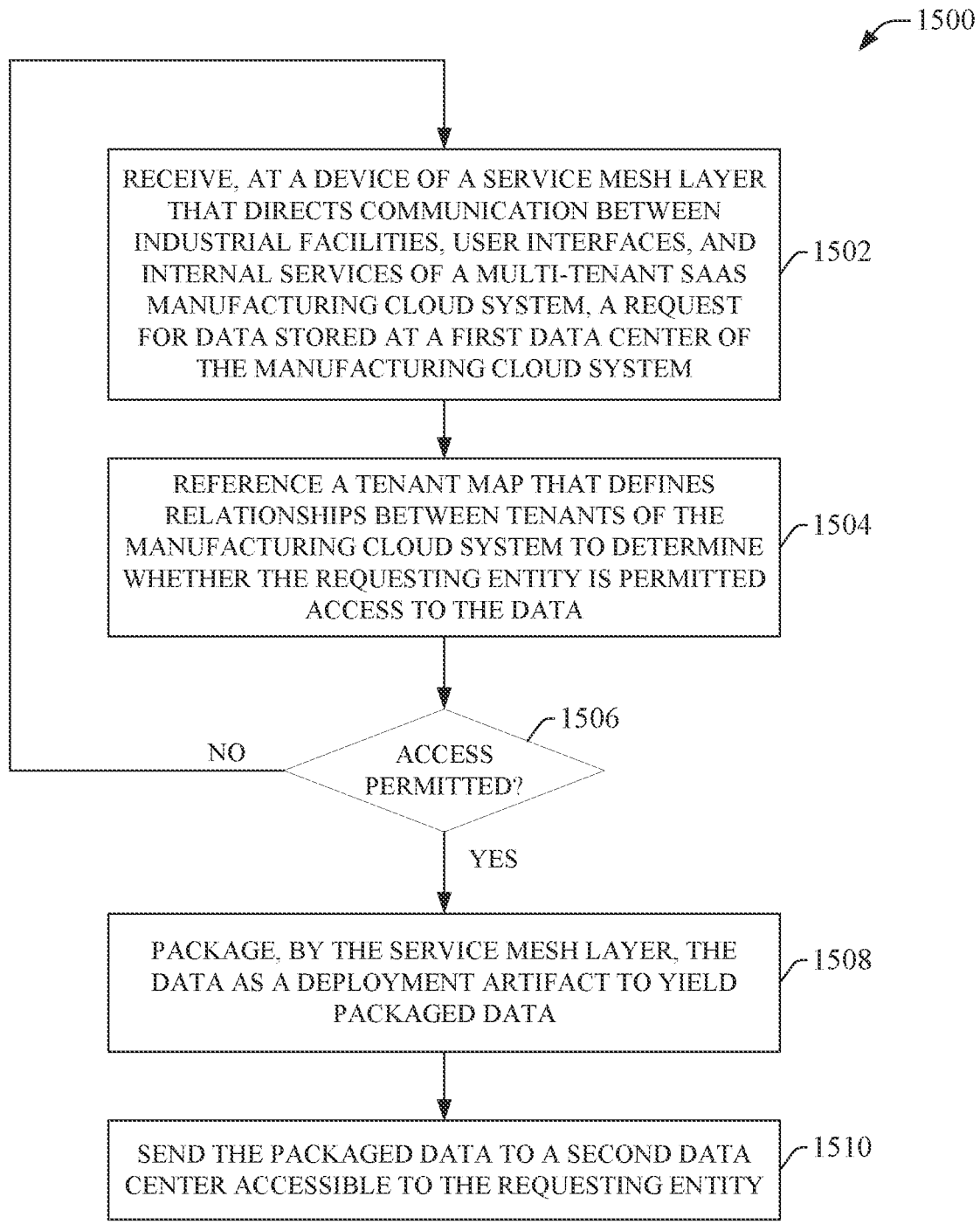
FIG. 15 is a flowchart of an example methodology for managing data access within the context of a global, multi-tenant manufacturing cloud system that executes as an SaaS on a cloud platform and provides industrial services to multiple customers.

FIG. 15 illustrates an example methodology 1500 for managing data access within the context of a global, multi-tenant manufacturing cloud system that executes as an SaaS on a cloud platform and provides industrial services to multiple customers, including but not limited to ERP, MES, quality, customer relations, supply chain management, customer relations, or other such services. Initially, at 1502, a request for data is received at a device of a service mesh layer that directs communication between industrial facilities owned by the system's customers, user interfaces that act as front ends into the system's applications, and internal services of the system. The requested data can reside at a first data center of the manufacturing cloud system. The request may be received from a user in a different region from that in which the first data center resides.

At 1504, one or more devices of the service mesh layer can reference a tenant map that defines relationships between tenants (or customers) of the manufacturing cloud system to determine whether the requesting entity is permitted to access the data being requested. In an example scenario, this determination can be based on whether the tenant map indicates that the requesting entity is associated with a customer having a business relationship with the customer who owns the data, and that this relationship permits sharing of the data being requested.

At 1506 a determination is made as to whether access to the data is permitted to the requesting entity based on the reference to the tenant map at step 1504. If the request is permitted (YES at step 1506), the methodology proceeds to step 1508, where one or more devices of the service mesh package the requested data as a deployment artifact to yield packaged data or metadata. At 1510, the devices of the service mesh send the packaged data or metadata to a second data center that is accessible to the requesting entity (e.g., a data center within a same region as the requesting entity). In some scenarios, there may be limitations as to the types of data that are permitted to be shared with the requesting entity. These limitations may be dictated by the particular business relationship between the requesting entity and the owner of the data, or may be dictated by regional laws on sharing of data outside of the region in which the data resides. In such scenarios, the devices of the service mesh can redact or filter the requested data set to yield a reduced data set that is in compliance with the requesting entity's access permissions or with the regional laws, and can then package and send this reduced data set as a deployment artifact in steps 1508 and 1510.

Figure 16:
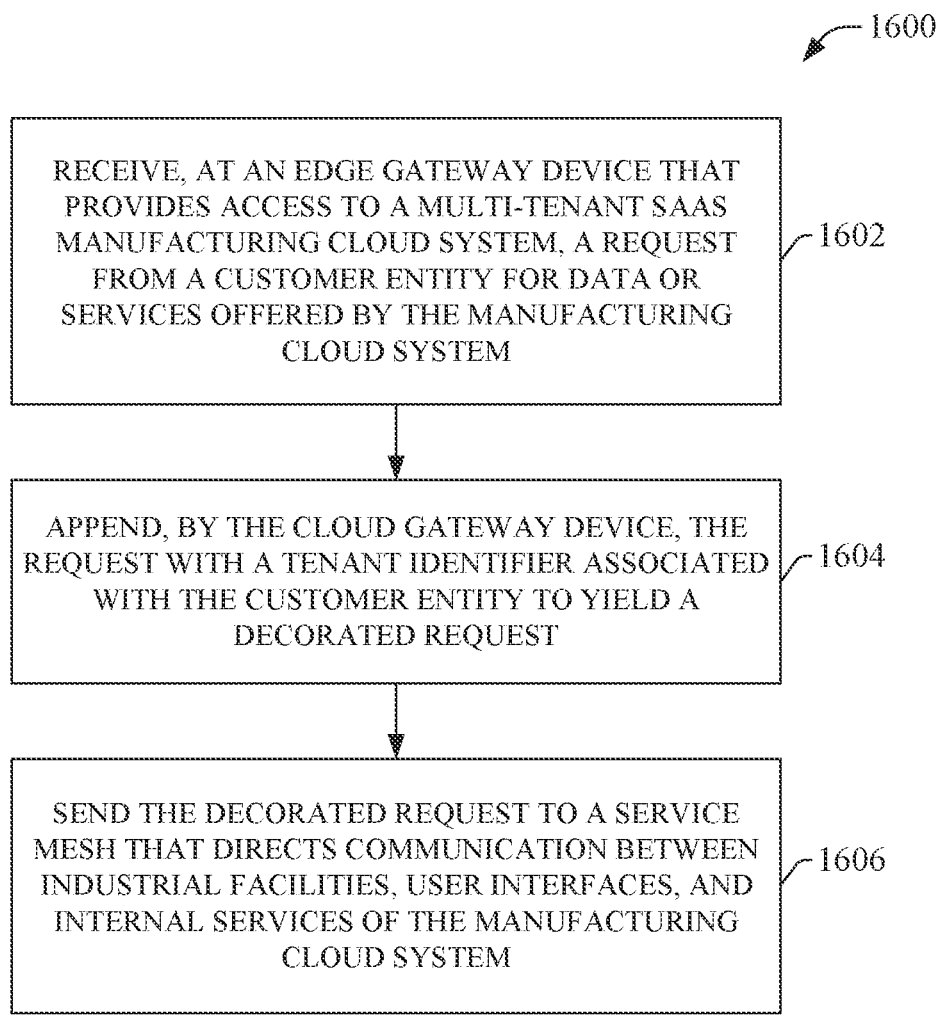
FIG. 16 is a flowchart of an example methodology for decorating a request directed to a multi-tenant cloud-based manufacturing cloud system with a tenant identifier at an edge layer of the system architecture.

FIG. 16 illustrates an example methodology 1600 for decorating a request directed to a multi-tenant cloud-based manufacturing cloud system with a tenant identifier at an edge layer of the system architecture. Initially, at 1602, a request directed to the manufacturing cloud system is received at an edge gateway device from a customer entity. The request can comprise a request for data stored by the manufacturing cloud system or a request for a service offered by the system. At 1604, the cloud gateway device appends the request with a tenant identifier associated with the customer entity to yield a decorated request. At 1606, the gateway device sends the decorated request to a service mesh layer that directs communication between industrial facilities, user interfaces, and internal services of the manufacturing cloud system.

Figure 17:
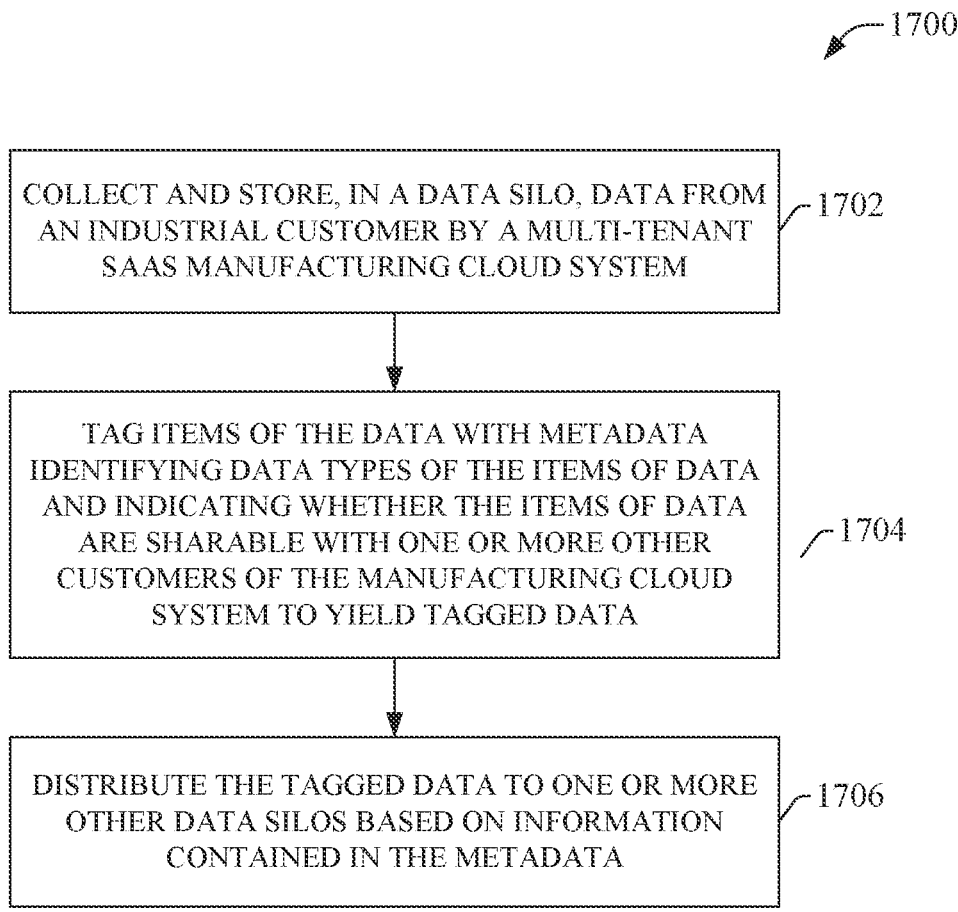
FIG. 17 is a flowchart of an example methodology for separating data between data silos used to store customer data collected by a global, multi-tenant manufacturing cloud system that executes as an SaaS on a cloud platform and provides data brokering services between customers.

FIG. 17 illustrates an example methodology 1700 for separating data between data silos used to store customer data collected by a global, multi-tenant manufacturing cloud system that executes as an SaaS on a cloud platform and provides data brokering services between customers. Initially, at 1702, data from an industrial customer of the manufacturing cloud system is collected and stored in a data silo by the manufacturing cloud system. At 1704, items of the data stored at step 1702 are tagged with metadata identifying the data types of the data items and also indicating whether the items of data are shareable with one or more other customers of the manufacturing cloud system, yielding tagged data. The metadata may also define other types of actions that are permitted to be taken on the data. At 1706, the tagged data is distributed to one or more other data silos based on information contained in the metadata.

Figure 18:
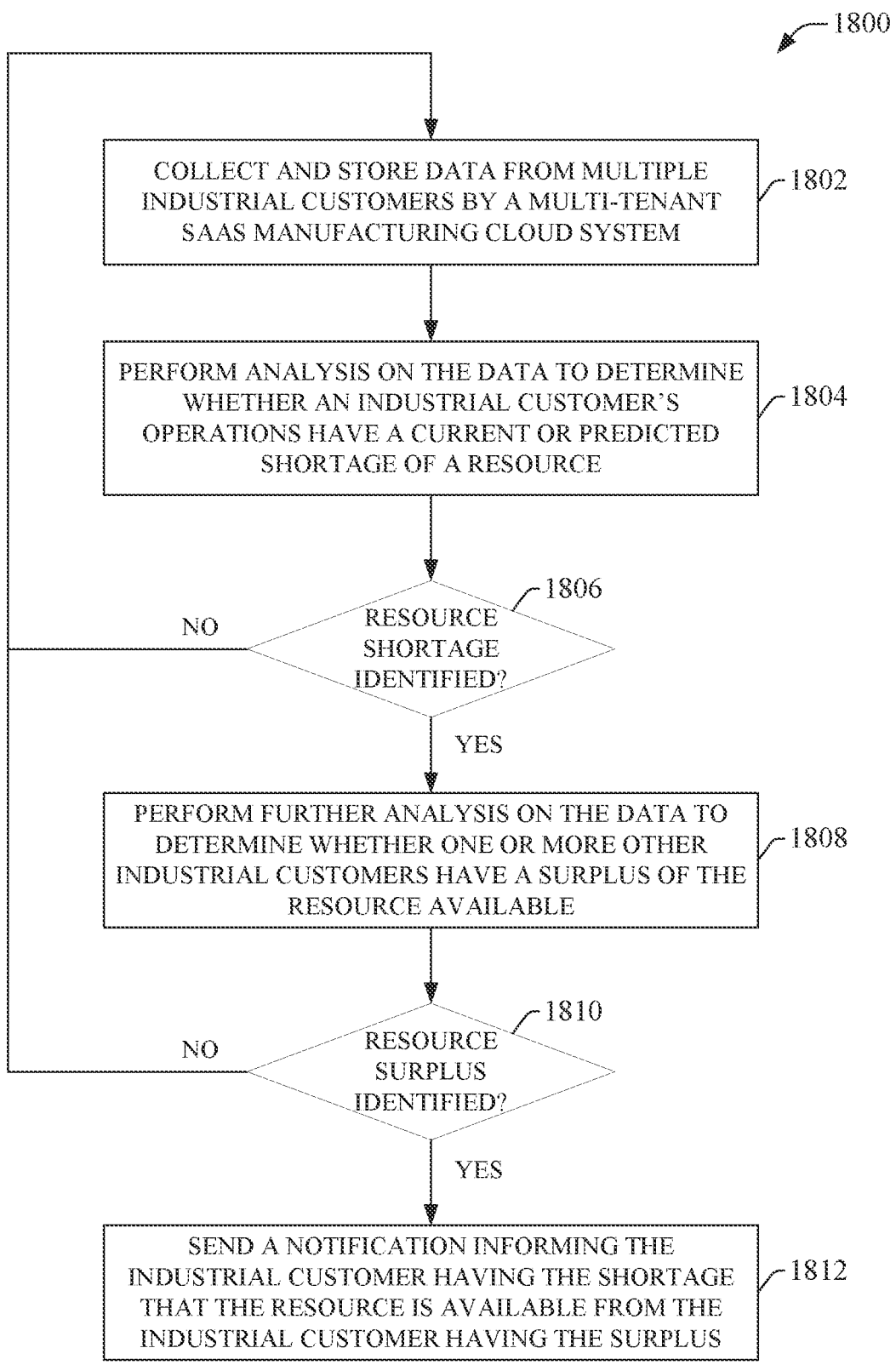
FIG. 18 is a flowchart of an example methodology for performing resource brokering services by a multi-tenant cloud-based manufacturing cloud system.

FIG. 18 illustrates an example methodology 1800 for performing resource brokering services by a multi-tenant cloud-based manufacturing cloud system. Initially, at 1802, data from multiple industrial customers is collected and stored by the manufacturing cloud system. The industrial customers can be different industrial enterprises (including different plant facilities that make up an enterprise), entities of a supply chain (e.g., suppliers, manufacturers, shipping entities, warehouse entities, distributors, etc.), or other such industrial customers. The collected data can include both OT data relating to production processes within a plant facility (e.g., data collected from industrial monitoring and control devices associated with automation systems, work schedules, production schedules, work order data, inventory levels of various parts or materials, or other such production information) as well as selected sets of IT data collected from the customer's business-level systems (e.g., HR information, purchase order data, or other such information). In some embodiments, the manufacturing cloud system can tag and distribute the data using methodology 1700 described above in connection with FIG. 17 to assist in brokering analysis.

At 1804, analysis is performed on the collected data to determine whether an industrial customer's operations have a current or predicted shortage of a resource. The resource can be, for example, a material or part required to produce units of a product manufactured by the customer. The resource may also be a labor resource required to carry out a current or planned operation. The shortage can reflect a shortage of the resource currently experienced by the customer, or may be a shortage predicted to occur at a future time based on predictive analysis of the customer's data.

At 1806, a determination is made as to whether a resource shortage is identified based on the analysis performed at step 1804. If a shortage is identified (YES at step 1806), the methodology proceeds to step 1808, where further analysis is performed on the collected data to determine whether one or more other industrial customers have a surplus of the resource available that will fulfill the customer's need. In the case of a predicted future need for the resource, the analysis can perform predictive analysis to determine whether one or more other customers will have the necessary resource surplus at the future time at which the original customer is expected to require the resource.

At 1810, a determination is made as to whether one or more other industrial customers are expected to have the necessary resource surplus. If another customer is found to have a surplus that will fulfil the original customer's need (YES at step 1810), the methodology proceeds to step 1812, where a notification is sent informing the customer having the shortage that the resource is available from the industrial customer found to have the surplus. The manufacturing cloud system can anonymize the potential supplier of the resource as needed until the customer having the shortage indicates a desire to initiate a transaction with the customer having the surplus. The system can also omit any of the supplying customer's proprietary information from the notification. If the supplying customer is located in a different geographic region from the customer seeking the resource, the system can use methodology 1500 described in connection with FIG. 15 to package and send any data to be shared between the two customers in connection with establishing a transaction for the resource. Also, in some embodiments, the system can also test the resource that is available from the supplying customer against one or more metrics defined by the purchasing customer to ensure that that the resource satisfies the purchaser's standards of quality, and can include this information as part of the notification sent to the purchasing customer. In some embodiments, the system can leverage blockchain technology, including distributive ledgers and smart contracts, in connection with these brokerage services.

Figure 19:
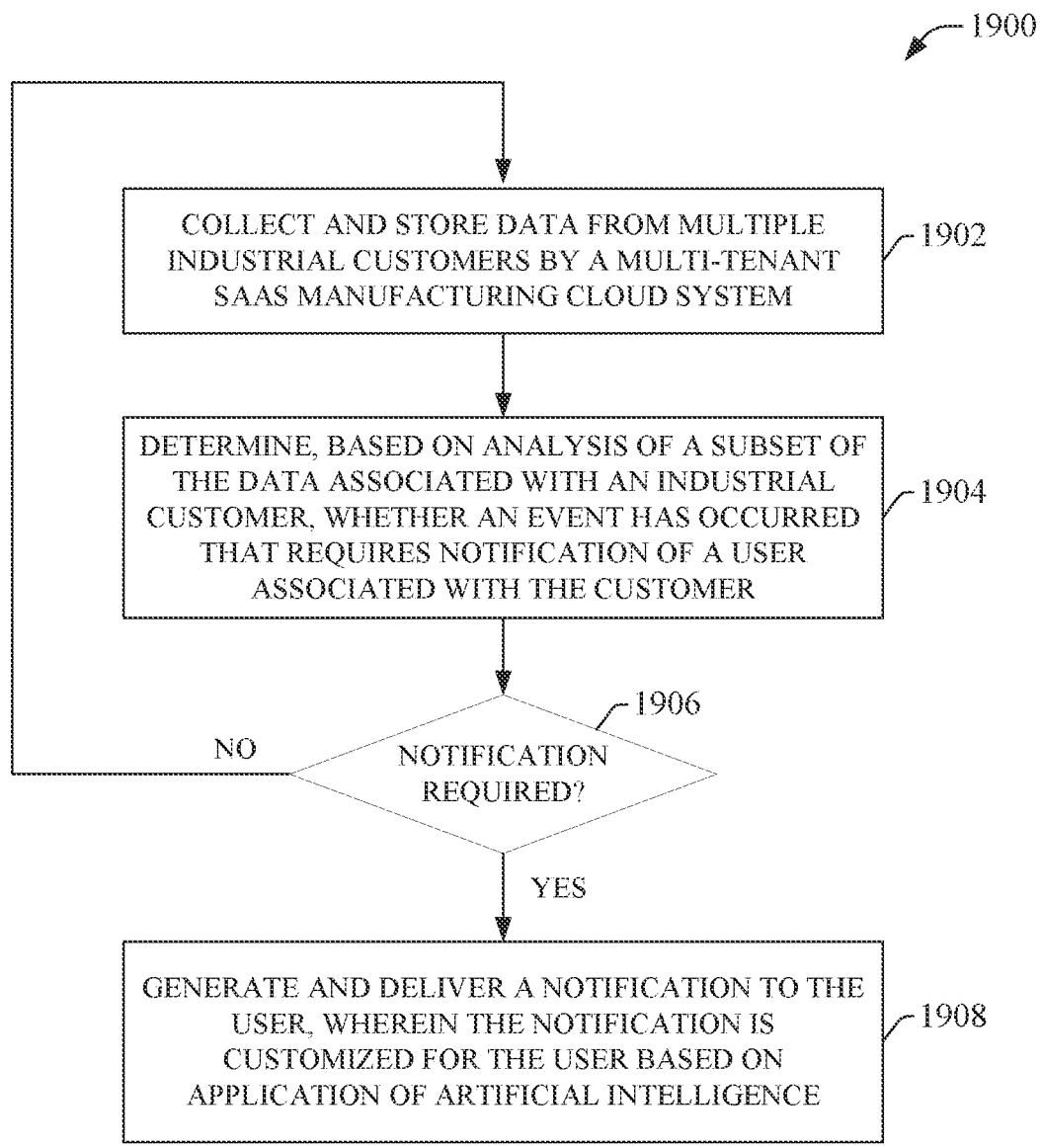
FIG. 19 is a flowchart of an example methodology for using applied AI to deliver notifications of industrial events that are customized to a recipient of the notifications.

FIG. 19 illustrates an example methodology 1900 for using applied AI to deliver notifications of industrial events that are customized to a recipient of the notifications. Initially, at 1902, data from multiple industrial customers is collected and stored by a multi-tenant cloud-based manufacturing cloud system. At 1804, analysis is performed on a subset of the data associated with one of the industrial customers to determine whether an event has occurred that requires notification of a user associated with the customer. The event may be, for example, an alarm condition or other type of event associated with an industrial process, a current or predicted supply chain issue, or another such event. At 1906, a determination is made as to whether a notification is required based on the analysis performed at step 1904. If a notification is required (YES at step 1906), the methodology proceeds to step 1908, where an appropriate notification is generated and delivered to the user. The manufacturing cloud system can use applied AI to customize the notification for the user. The notification can be formatted as a graphical display, alphanumeric text, or another format. The AI-driven customization of the notification can control such features as the amount of information to include in the notification, the frequency of notification, a preferred formatting of the notification, the target device to which the notification is delivered, or other such notification features.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 20:
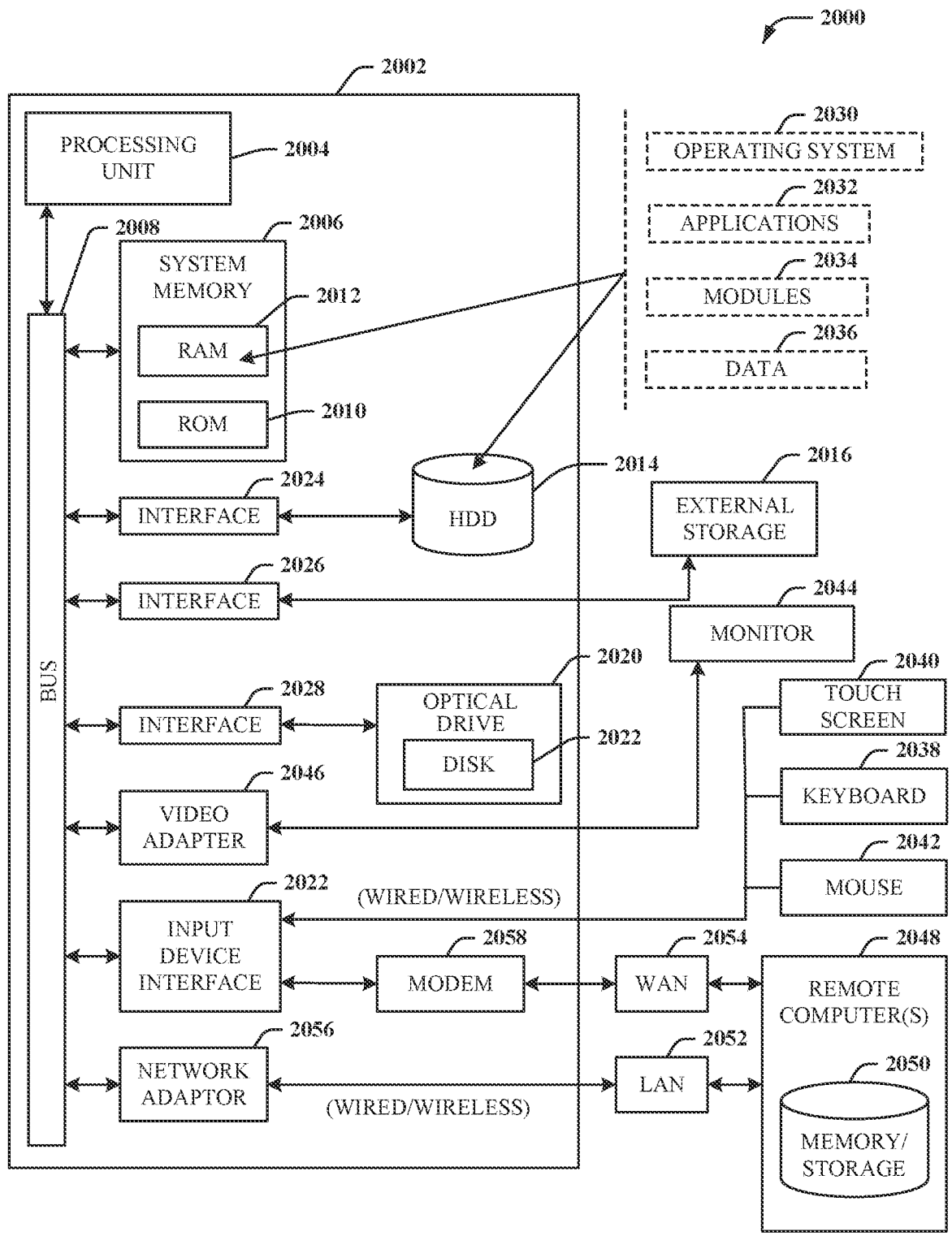
FIG. 20 is an example computing environment.
Figure 21:
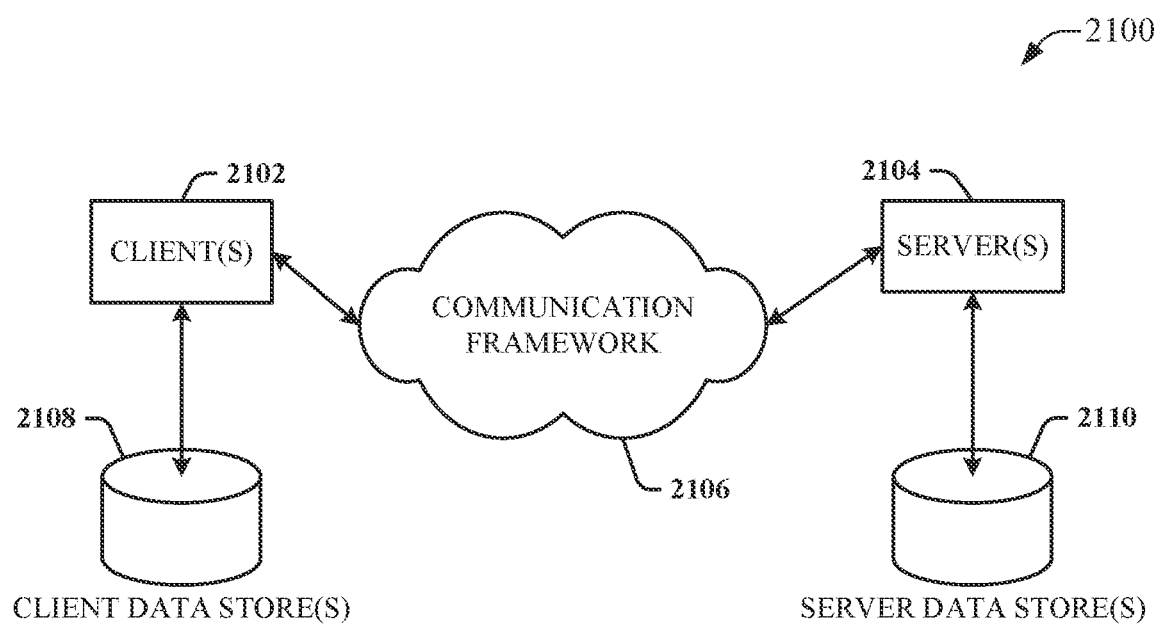
FIG. 21 is an example networking environment.

In order to provide a context for the various aspects of the disclosed subject matter, FIGS. 20 and 21 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 20, the example environment 2000 for implementing various embodiments of the aspects described herein includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 includes ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also include a high-speed RAM such as static RAM for caching data.

The computer 2002 further includes an internal hard disk drive (HDD) 2014 (e.g., EIDE, SATA), one or more external storage devices 2016 (e.g., a magnetic floppy disk drive (FDD) 2016, a memory stick or flash drive reader, a memory card reader, etc.) and an optical disk drive 2020 (e.g., which can read or write from a CD-ROM disc, a DVD, a BD, etc.). While the internal HDD 2014 is illustrated as located within the computer 2002, the internal HDD 2014 can also be configured for external use in a suitable chassis (not shown). Additionally, while not shown in environment 2000, a solid state drive (SSD) could be used in addition to, or in place of, an HDD 2014. The HDD 2014, external storage device(s) 2016 and optical disk drive 2020 can be connected to the system bus 2008 by an HDD interface 2024, an external storage interface 2026 and an optical drive interface 2028, respectively. The interface 2024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

Computer 2002 can optionally comprise emulation technologies. For example, a hypervisor (not shown) or other intermediary can emulate a hardware environment for operating system 2030, and the emulated hardware can optionally be different from the hardware illustrated in FIG. 20. In such an embodiment, operating system 2030 can comprise one virtual machine (VM) of multiple VMs hosted at computer 2002. Furthermore, operating system 2030 can provide runtime environments, such as the Java runtime environment or the .NET framework, for application programs 2032. Runtime environments are consistent execution environments that allow application programs 2032 to run on any operating system that includes the runtime environment. Similarly, operating system 2030 can support containers, and application programs 2032 can be in the form of containers, which are lightweight, standalone, executable packages of software that include, e.g., code, runtime, system tools, system libraries and settings for an application.

Further, computer 2002 can be enable with a security module, such as a trusted processing module (TPM). For instance with a TPM, boot components hash next in time boot components, and wait for a match of results to secured values, before loading a next boot component. This process can take place at any layer in the code execution stack of computer 2002, e.g., applied at the application execution level or at the operating system (OS) kernel level, thereby enabling security at any level of code execution.

A user can enter commands and information into the computer 2002 through one or more wired/wireless input devices, e.g., a keyboard 2038, a touch screen 2040, and a pointing device, such as a mouse 2042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2004 through an input device interface 2044 that can be coupled to the system bus 2008, but can be connected by other interfaces, such as a parallel port, an IEEE 1394 serial port, a game port, a USB port, an IR interface, a BLUETOOTH® interface, etc.

A monitor 2044 or other type of display device can be also connected to the system bus 2008 via an interface, such as a video adapter 2046. In addition to the monitor 2044, a computer typically includes other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also include a wireless access point (AP) disposed thereon for communicating with the adapter 2056 in a wireless mode.

When used in a WAN networking environment, the computer 2002 can include a modem 2058 or can be connected to a communications server on the WAN 2054 via other means for establishing communications over the WAN 2054, such as by way of the Internet. The modem 2058, which can be internal or external and a wired or wireless device, can be connected to the system bus 2008 via the input device interface 2022. In a networked environment, program modules depicted relative to the computer 2002 or portions thereof, can be stored in the remote memory/storage device 2050. It will be appreciated that the network connections shown are example and other means of establishing a communications link between the computers can be used.

When used in either a LAN or WAN networking environment, the computer 2002 can access cloud storage systems or other network-based storage systems in addition to, or in place of, external storage devices 2016 as described above. Generally, a connection between the computer 2002 and a cloud storage system can be established over a LAN 2052 or WAN 2054 e.g., by the adapter 2056 or modem 2058, respectively. Upon connecting the computer 2002 to an associated cloud storage system, the external storage interface 2026 can, with the aid of the adapter 2056 and/or modem 2058, manage storage provided by the cloud storage system as it would other types of external storage. For instance, the external storage interface 2026 can be configured to provide access to cloud storage sources as if those sources were physically connected to the computer 2002.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 21 is a schematic block diagram of a sample computing environment 2100 with which the disclosed subject matter can interact. The sample computing environment 2100 includes one or more client(s) 2102. The client(s) 2102 can be hardware and/or software (e.g., threads, processes, computing devices). The sample computing environment 2100 also includes one or more server(s) 2104. The server(s) 2104 can also be hardware and/or software (e.g., threads, processes, computing devices). The servers 2104 can house threads to perform transformations by employing one or more embodiments as described herein, for example. One possible communication between a client 2102 and servers 2104 can be in the form of a data packet adapted to be transmitted between two or more computer processes. The sample computing environment 2100 includes a communication framework 2106 that can be employed to facilitate communications between the client(s) 2102 and the server(s) 21204. The client(s) 2102 are operably connected to one or more client data store(s) 2108 that can be employed to store information local to the client(s) 2102. Similarly, the server(s) 2104 are operably connected to one or more server data store(s) 2110 that can be employed to store information local to the servers 2104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
internal services that implement a manufacturing cloud system, wherein
the manufacturing cloud system is a multi-tenant Software-as-a-Service (SaaS) system that executes an industrial manufacturing execution system (MES) on a cloud platform,
the manufacturing cloud system collects and stores industrial data owned by multiple customer entities in multiple data silos, and the cloud platform comprises at least:
a first data center that stores data for, and is accessible by, a first subset of the multiple customer entities within a first region, the first subset including a first entity of the multiple customer entities, and
a second data center residing in a different country than the first data center and that stores data for, and is accessible by, a second subset of the multiple customer entities within a second region, the second subset including a second entity of the multiple customer entities;
a tagging component configured to tag items of the industrial data associated with the first entity with metadata to yield tagged data, wherein the metadata for a data item, of the items of the industrial data, identifies a data type of the data item and indicates whether the data item is sharable with the second entity;
a service communicator component configured to determine a scope of the tagged data permitted to be shared with the second entity based on the metadata, a business relationship between the first entity and the second entity defined by tenant map data that defines business relationships between the multiple customer entities, and an egress rule that defines types or sets of data that are not to be passed to data centers outside a country in which the first data center resides, wherein the business relationship is at least one of a relationship between a supplier and a manufacturer, a relationship between a manufacturer and a shipper, or a relationship between a manufacturer and a retailer; and
a data packaging component configured to route at least a subset of the tagged data from the first data center to the second data center in accordance with the scope of the tagged data permitted to be shared with the second entity, wherein the data packaging component is configured to redact a portion of the tagged data in accordance with the egress rule to yield the subset of the tagged data.

2. The system of claim 1, wherein
the data packaging component is further configured to archive the tagged data in response to elapse of a duration of time subsequent to collection of the tagged data, and
the duration of time is defined by retention rules associated with respective data types.

3. The system of claim 1, wherein the metadata further identifies the second entity with which the data item is sharable.

4. The system of claim 1, wherein the tagged data comprises at least one of recipe data defining control process parameters for manufacturing a type of product or material, employee information, production statistics, or device configuration data.

5. The system of claim 1, wherein the data packaging component is configured to package the subset of the tagged data as a deployment artifact, and to route the deployment artifact to the second data center.

6. The system of claim 1, wherein the tenant map data defines at least one of a limitation or a condition on sharing of data between the first entity and the second entity.

7. The system of claim 1, wherein the egress rule further defines permitted data boundaries for the country in which the first data center resides.

8. The system of claim 1, wherein the manufacturing cloud system further executes, on the cloud platform, at least one of an enterprise resource planning (ERP) system, a quality management system, a supply chain management system, or a customer relationship management (CRM) system.

9. The system of claim 1, wherein the executable components further comprise a data sharing component configured to distribute, based on the metadata, a portion of the tagged data from a first data silo, of the multiple data silos, to one or more second data silos of the multiple data silos accessible by the second entity.

10. A method, comprising:
executing, by a system comprising a processor, a manufacturing cloud system, wherein
the manufacturing cloud system is a multi-tenant Software-as-a-Service (SaaS) system that executes an industrial manufacturing execution system (MES) on a cloud platform,
the manufacturing cloud system collects and stores industrial data owned by multiple customer entities in multiple data silos, and
the cloud platform comprises at least:
a first data center that stores data for, and is accessible by, a first subset of the multiple customer entities within a first region, the first subset including a first entity of the multiple customer entities, and
a second data center that resides in a different country than the first data center and that stores data for, and is accessible by, a second subset of the multiple customer entities within a second region, the second subset including a second entity of the multiple customer entities;
tagging, by the system, items of the industrial data associated with the first entity with metadata to yield tagged data, wherein the metadata for a data item, of the items of the industrial data, identifies a data type of the data item and indicates whether the data item is sharable with the second entity;

determining, by the system, a scope of the tagged data permitted to be shared with the second entity based on the metadata, and a business relationship between the first entity and the second entity defined by tenant map data that defines business relationships between the multiple customer entities, and an egress rule that defines types or sets of data that are not to be passed to data centers outside a country in which the first data center resides; and routing, by the system, a subset of the tagged data from the first data center to the second data center in accordance with the scope of the tagged data permitted to be shared with the second entity, wherein the business relationship is at least one of a relationship between a supplier and a manufacturer, a relationship between a manufacturer and a shipper, or a relationship between a manufacturer and a retailer, and the routing comprises redacting a portion of the tagged data in accordance with the egress rule to yield the subset of the tagged data.

11. The method of claim 10, further comprising archiving, by the system, the tagged data in response to elapse of a duration of time subsequent to collection of the tagged data, wherein the duration of time is defined by retention rules associated with respective data types.

12. The method of claim 10, wherein the metadata further identifies the second entity with which the data item is sharable.

13. The method of claim 10, wherein the tagged data comprises at least one of recipe data defining control process parameters for manufacturing a type of product or material, employee information, production statistics, or device configuration data.

14. The method of claim 10, wherein the routing further comprises:

packaging the subset of the tagged data as a deployment artifact, and routing the deployment artifact to the second data center.

15. The method of claim 10, wherein the tenant map data further defines at least one of a limitation or a condition on sharing of data between the first entity and the second entity.

16. The method of claim 10, wherein the manufacturing cloud system further executes, on the cloud platform, at least one of an enterprise resource planning (ERP) system, a quality management system, a supply chain management system, or a customer relationship management (CRM) system.

17. A non-transitory computer-readable medium having stored thereon instructions that, in response to execution, cause system comprising a processor to perform operations, the operations comprising:

implementing a manufacturing cloud system, wherein the manufacturing cloud system is a multi-tenant Software-as-a-Service (SaaS) system that executes an industrial manufacturing execution system (MES) on a cloud platform, the manufacturing cloud system collects and stores industrial data owned by multiple customer entities in multiple data silos, and the cloud platform comprises at least:

a first data center that stores data for, and is accessible by, a first subset of the multiple customer entities within a first region, the first subset including a first entity of the multiple customer entities, and a second data center residing in a different country than the first data center that stores data for, and is accessible by, a second subset of the multiple customer entities within a second region, the second subset including a second entity of the multiple customer entities;

tagging items of the industrial data associated with the first entity with metadata to yield tagged data, wherein the metadata for a data item, of the items of the industrial data, identifies a data type of the data item and indicates whether the data item is sharable with the second entity;

determining a scope of the tagged data permitted to be shared with the second entity based on the metadata, a business relationship between the first entity and the second entity defined by tenant map data that defines business relationships between the multiple customer entities, and an egress rule that defines types or sets of data that are not to be passed to data centers outside a country in which the first data center resides; and routing a subset of the tagged data from the first data center to the second data center in accordance with the scope of the tagged data permitted to be shared with the second entity, wherein the business relationship is at least one of a relationship between a supplier and a manufacturer, a relationship between a manufacturer and a shipper, or a relationship between a manufacturer and a retailer, and the routing comprises redacting a portion of the tagged data in accordance with the egress rule to yield the subset of the tagged data.

18. The non-transitory computer-readable medium of claim 17, wherein the tagged data comprises at least one of recipe data defining control process parameters for manufacturing a type of product or material, employee information, production statistics, or device configuration data.

19. The non-transitory computer-readable medium of claim 17, wherein the operations further comprise archiving the tagged data in response to elapse of a duration of time subsequent to collection of the tagged data, wherein the duration of time is defined by retention rules associated with respective data types.

20. The non-transitory computer-readable medium of claim 17, wherein the tenant map data further defines at least one of a limitation or a condition on sharing of data between the first entity and the second entity.

* * * * *